United States Patent
Yeazel et al.

(10) Patent No.: US 12,214,937 B2
(45) Date of Patent: Feb. 4, 2025

(54) PORT SYSTEM AND METHOD FOR AN EMBALMING MACHINE

(71) Applicant: Frigid Fluid Company, Northlake, IL (US)

(72) Inventors: Brian Yeazel, River Forest, IL (US); Matt Smith, Oxford, MI (US)

(73) Assignee: Frigid Fluid Company, Northlake, IL (US)

( * ) Notice: Subject to any disclaimer, the term of this patent is extended or adjusted under 35 U.S.C. 154(b) by 968 days.

(21) Appl. No.: 17/071,476

(22) Filed: Oct. 15, 2020

(65) Prior Publication Data

US 2021/0106001 A1    Apr. 15, 2021

Related U.S. Application Data

(60) Provisional application No. 62/915,081, filed on Oct. 15, 2019.

(51) Int. Cl.
| | | |
|---|---|---|
| *A01N 1/02* | (2006.01) | |
| *B01F 25/10* | (2022.01) | |
| *B01F 35/00* | (2022.01) | |
| *B01F 35/50* | (2022.01) | |
| *B01F 35/512* | (2022.01) | |
| *B65D 43/16* | (2006.01) | |

(52) U.S. Cl.
CPC ......... *B65D 43/163* (2013.01); *A01N 1/0242* (2013.01); *B01F 25/10* (2022.01); *B01F 35/187* (2022.01); *B01F 35/50* (2022.01); *B01F 35/512* (2022.01)

(58) Field of Classification Search
CPC .............................. B01F 25/10; A01N 1/0242
USPC ....... 366/165.1, 165.2, 165.4, 165.5; 27/24.1
See application file for complete search history.

(56) References Cited

U.S. PATENT DOCUMENTS

| | | | | |
|---|---|---|---|---|
| 134,100 | A | * 12/1872 | Rengel | ..................... B01F 25/50 |
| | | | | 366/267 |
| 302,484 | A | 7/1884 | Haslage | |
| 626,950 | A | * 6/1899 | Wheelwright | ........ B01F 25/821 |
| | | | | 366/136 |

(Continued)

FOREIGN PATENT DOCUMENTS

| | | |
|---|---|---|
| CN | 206793690 U | 12/2017 |
| EP | 3221859 B1 | 10/2020 |

OTHER PUBLICATIONS

International Search Report and Written Opinion issued in related Application Serial No. PCT/US2020/055798 on Jan. 19, 2021.

(Continued)

*Primary Examiner* — David L Sorkin
(74) *Attorney, Agent, or Firm* — Fitch, Even, Tabin & Flannery LLP

(57) ABSTRACT

An embalming machine for mixing of fluids and cleaning of a reservoir may include a reservoir. The embalming machine may include a tube extending from a lower portion to an upper portion of the reservoir, the tube providing a pathway for fluid to travel to the reservoir. The embalming machine may include a port connected to an end of the tube adjacent to the upper portion of the reservoir, the port being configured to dispense the fluid traveling through the tube and into an interior of the reservoir.

17 Claims, 15 Drawing Sheets

(56) References Cited

U.S. PATENT DOCUMENTS

| | | | | |
|---|---|---|---|---|
| 1,160,848 | A | * | 11/1915 | Conklin .................. B01F 25/10 366/137 |
| 2,060,925 | A | | 11/1936 | Brosh et al. |
| 2,118,704 | A | | 5/1938 | Grontkowski |
| 2,163,172 | A | | 6/1939 | Haase |
| 2,388,337 | A | | 11/1945 | Moody |
| 2,626,446 | A | | 1/1953 | Moore |
| 2,754,866 | A | | 7/1956 | Coltman, Jr. |
| 2,997,373 | A | * | 8/1961 | Stephens ................ B01F 21/15 422/282 |
| 3,005,571 | A | | 10/1961 | Hall |
| 3,086,621 | A | | 4/1963 | Dale |
| 3,090,095 | A | | 5/1963 | Moore |
| 3,095,066 | A | | 6/1963 | Abplanalp, Jr. |
| 3,419,945 | A | | 1/1969 | Sawyer |
| 3,528,146 | A | | 9/1970 | Markarian |
| 4,053,963 | A | * | 10/1977 | Matheu .............. A22C 17/0053 27/24.1 |
| 4,080,693 | A | * | 3/1978 | Pruitt ....................... A01N 1/00 27/24.1 |
| 5,829,108 | A | | 11/1998 | Decarbo, Sr. |
| 5,961,845 | A | * | 10/1999 | List .................... B01F 35/7179 366/132 |
| 6,065,860 | A | * | 5/2000 | Fuchsbichler .......... B01F 25/10 366/136 |
| 6,697,132 | B2 | | 2/2004 | Saiki |
| 6,783,018 | B1 | | 8/2004 | Rondeau |
| 8,960,999 | B1 | * | 2/2015 | Ochoa .................. B01F 27/806 366/244 |
| 9,890,354 | B1 | | 2/2018 | Hall |
| 10,690,129 | B2 | | 6/2020 | Paulus |
| 11,596,146 | B2 | | 3/2023 | Bernaudo |
| 2003/0186203 | A1 | | 10/2003 | Aboud |
| 2006/0023039 | A1 | | 2/2006 | Padmanabhan et al. |
| 2012/0084953 | A1 | | 4/2012 | Herridge |
| 2013/0313256 | A1 | | 11/2013 | Brown |
| 2020/0114086 | A1 | | 4/2020 | Bernardo |
| 2020/0396987 | A1 | * | 12/2020 | Bernaudo ........... G01L 19/0007 |
| 2022/0362089 | A1 | | 11/2022 | Yeazel |
| 2022/0366378 | A1 | | 11/2022 | Yeazel |

OTHER PUBLICATIONS

International Search Report and Written Opinion issued in related Application Serial No. PCT/US2020/055789 on Jan. 14, 2021.

AWESOMEDAN157. Embalming Machine. YouTube. Sep. 16, 2007 (Sep. 16, 2007). [retrieved on Dec. 3, 2020]. Retrieved from internet: <URL:https://www.youtube.com/watch? v=a8xCnR_EEDg>entire video.

Buckethead Embalming Machine Tutorial' (Your Mortuary Magic Store), Sep. 14, 2019 (Sep. 14, 2019) [online] retrieved from URL: <https://www.youtube.com/watch?v=m6bln0Bk6lo&t=3s>, entire document.

USPTO; U.S. Appl. No. 17/071,516; Non-Final Rejection mailed Feb. 21, 2024; (pp. 1-10).

* cited by examiner

1. Fluid from reservoir may be sucked (i.e., pumped) via a pump outlet into at least a second tube and through a bypass loop.

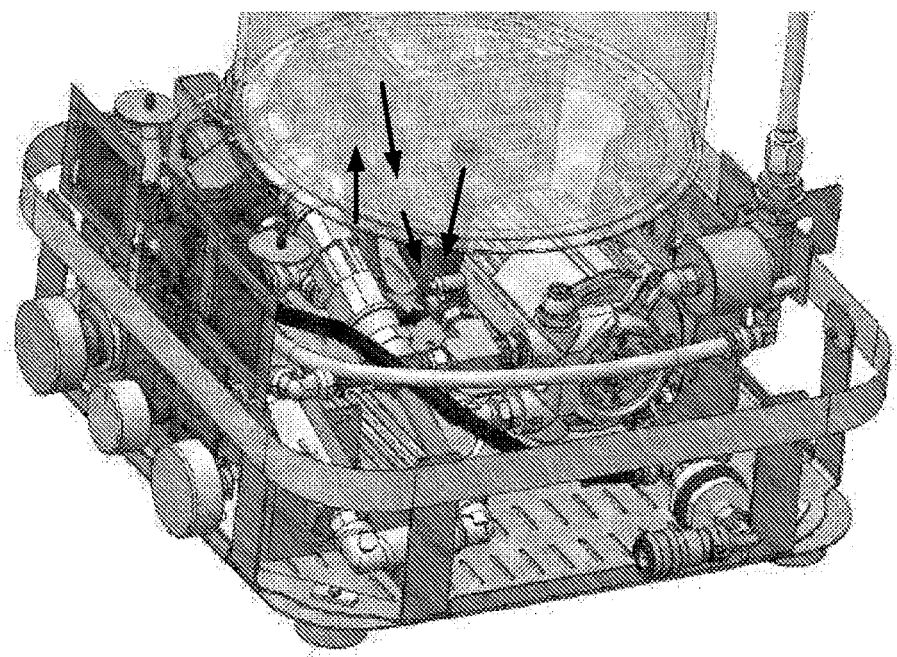

An illustrative example of the system components inside of the embalming machine according to one or more example implementations depicting the flow path (shown via arrows) that fluid may take from the reservoir into at least a second tube and through a bypass loop to be circulated throughout the system and back again.

FIG. 15

3. Liquid may also travel from a pump outlet to a mix solenoid circuit.

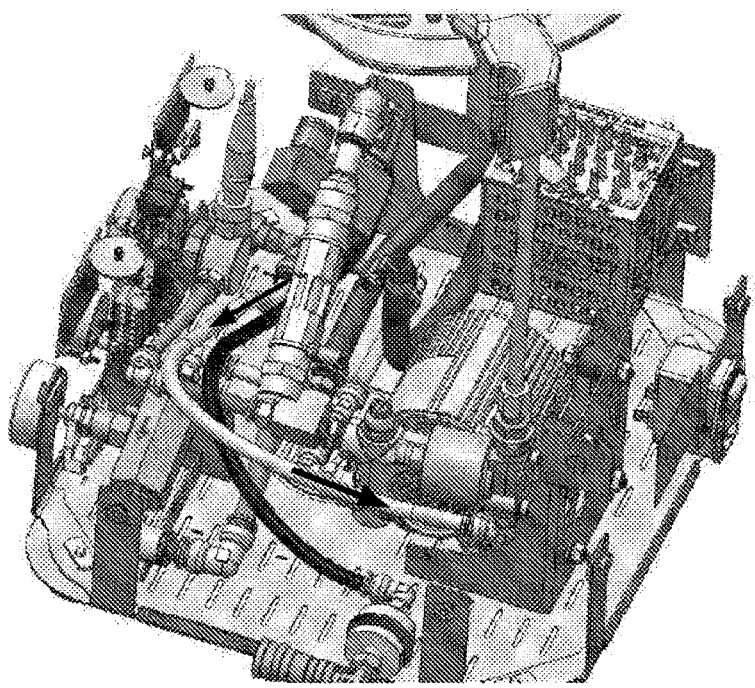

An illustrative example of the system components inside of the embalming machine according to one or more example implementations depicting the flow path (shown via arrows) that fluid may take from the reservoir into at least a second tube and through a bypass loop to be circulated throughout the system and back again.

FIG. 17

4. Fluid may leave the pump outlet, be routed through the hydraulic flow valve, followed by a ultra-sonic flow sensor, and then to a quick-disconnect where the inject hose plugs into on the side of the embalming machine. The ultra-sonic flow sensor may be configured to process the flow in real-time, send that data (e.g., flow rate) to a circuit board of which may signal for the data to be displayed on one or more display screens.

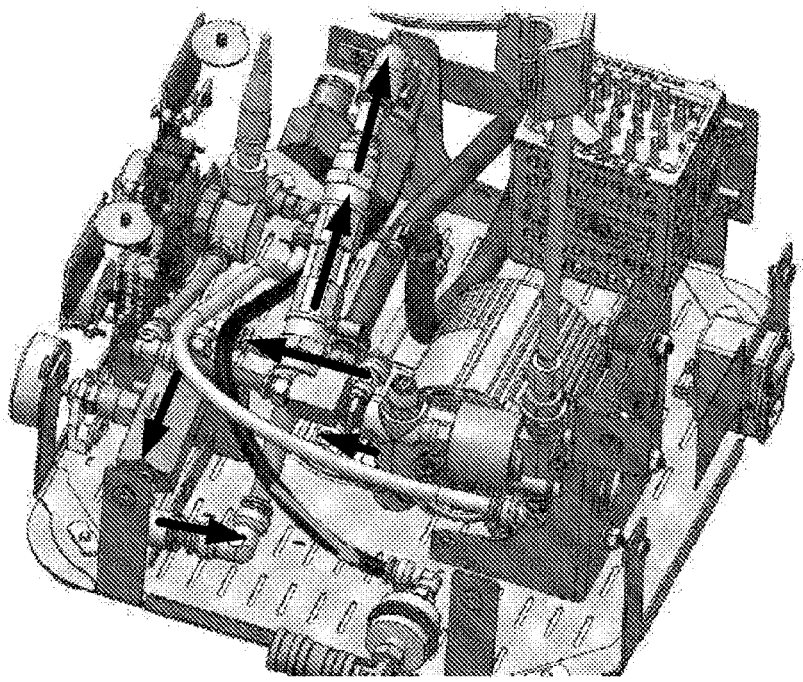

An illustrative example of the system components inside of the embalming machine according to one or more example implementations depicting the flow path (shown via arrows) that fluid may take from the reservoir into at least a second tube and through a bypass loop to be circulated throughout the system and back again.

FIG. 18

5. As a user turns the pressure regulator knob, the pressure of the fluid in the system may increase or decrease. Accordingly, the position of the knob is proportional to the amount of bypass fluid going back to the reservoir and pump. To increase pressure, less fluid goes through the bypass route. To decrease pressure, more fluid goes through the bypass route.

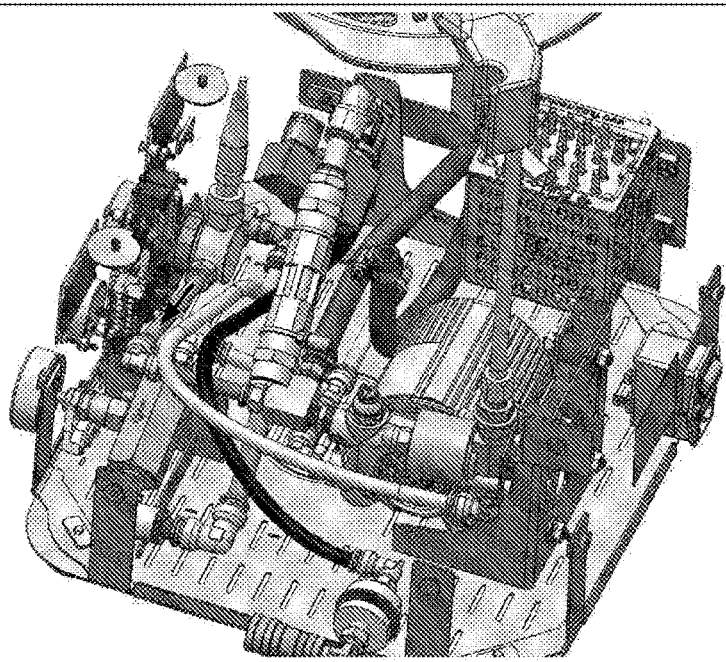

An illustrative example of the system components inside of the embalming machine according to one or more example implementations depicting the flow path (shown via arrows) that fluid may take from the reservoir into at least a second tube and through a bypass loop to be circulated throughout the system and back again.

FIG. 19

PORT SYSTEM AND METHOD FOR AN EMBALMING MACHINE

CROSS-REFERENCE TO RELATED APPLICATION

This application claims the benefit of U.S. Provisional Application No. 62/915,081, filed on 15 Oct. 2019, the contents of which are incorporated herein by reference.

FIELD OF THE INVENTION

The present invention generally relates to an embalming machine, and more specifically, an embalming machine equipped for mixing of fluids and cleanability of an embalming machine reservoir.

BACKGROUND OF THE INVENTION

Embalming, a technique typically used to prepare a cadaver for burial, is the process by which blood and bodily fluids are removed from a cadaver and replaced with an embalming fluid using an embalming machine. While embalming provides several societal benefits, including restoring the cadaver's appearance and delaying decay to allow time to arrange for a funeral and transport of the cadaver to a burial site, there exists several shortcomings in the maintenance required of the embalming machine between each embalming process, thus necessitating the need for a more efficient system to ready the machine for the next cadaver.

BRIEF SUMMARY OF DISCLOSURE

In one example implementation, an embalming machine may include a reservoir. The embalming machine may include a tube extending from a lower portion to an upper portion of the reservoir. The tube may provide a pathway for fluid to travel to the reservoir. The embalming machine may include a port connected to an end of the tube adjacent to the upper portion of the reservoir. The port may be configured to dispense the fluid traveling through the tube and into an interior of the reservoir.

One or more of the following example features may be included. The port may be positioned to dispense fluid into the interior of the reservoir to flow in a generally centrifugal motion around the interior of the reservoir. At least a portion of the interior of the reservoir may include a hydrophobic surface. The embalming machine may further include a number of selectable settings that may include, at least in part, a clean mode and a mix mode. The fluid may be dispensed from the port and into the interior of the reservoir at a defined pressure. The fluid may be dispensed from the port and into the interior of the reservoir at a defined flow rate. The embalming machine may further include at least a second tube projecting from inside of the lower portion of the reservoir. The at least second tube may be configured to inject fluid into the interior of the reservoir. The embalming machine may further include a reservoir lid configured to at least partially enclose the upper portion of the reservoir, wherein the reservoir lid includes an access hatch integrated into the reservoir lid.

In another example implementation, a method for mixing of fluids in an embalming machine may include selecting a mix mode from a number of selectable settings on the embalming machine. The embalming machine may include a reservoir. The embalming machine may further include a tube extending from a lower portion to an upper portion of the reservoir. The tube may provide a pathway for fluid to travel to the reservoir. The embalming machine may further include a port connected to an end of the tube adjacent to the upper portion of the reservoir. The method may further include dispensing the fluid from the port and into an interior of the reservoir. The port may be positioned to dispense the fluid into the interior of the reservoir to flow in a generally centrifugal motion around the interior of the reservoir.

One or more of the following features may be included. The method may further include pouring at least a second fluid into the interior of the reservoir through an access hatch integrated into a reservoir lid. The reservoir lid may be configured to at least partially enclose the upper portion of the reservoir. The method may further include injecting the fluid into the interior of the reservoir from at least a second tube projecting from inside of the lower portion of the reservoir. At least a portion of the interior of the reservoir may include a hydrophobic surface. The fluid may be dispensed from the port and into the interior of the reservoir at a defined pressure. The fluid may be dispensed from the port and into the interior of the reservoir at a defined flow rate.

According to another implementation, a method for cleaning of fluids from an embalming machine may include selecting a clean mode from a number of selectable settings on the embalming machine. The embalming machine may include a reservoir. The embalming machine may further include a tube extending from a lower portion to an upper portion of the reservoir. The tube may provide a pathway for fluid to travel to the reservoir. The embalming machine may further include a port connected to an end of the tube adjacent to the upper portion of the reservoir. The method may further include dispensing the fluid from the port and into an interior of the reservoir. The port may be positioned to dispense the fluid into the interior of the reservoir to flow in a generally centrifugal motion around the interior of the reservoir.

One or more of the following features may be included. The method may further include pouring at least a second fluid through an access hatch integrated into a reservoir lid. The reservoir lid may be configured to at least partially enclose an upper portion of the reservoir. The method may further include injecting the fluid from at least a second tube projecting from inside of the lower portion of the reservoir. At least a portion of the interior of the reservoir may include a hydrophobic surface. The fluid may be dispensed from the port and into the interior of the reservoir at a defined pressure. The fluid may be dispensed from the port and into the interior of the reservoir at a defined flow rate.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 15 is a cross-sectional view of the illustrative example of the embalming machine of FIG. 1 depicting a flow path that fluids may take as they circulate throughout the inside the embalming machine;

FIG. 17 is a cross-sectional view of the illustrative example of the embalming machine of FIG. 1 depicting a flow path that fluids may take as they circulate throughout the inside the embalming machine;

FIG. 18 is a cross-sectional view of the illustrative example of the embalming machine of FIG. 1 depicting a flow path that fluids may take as they circulate throughout the inside the embalming machine; and FIG. 19 is a cross-sectional view of the illustrative example of the embalming machine of FIG. 1 depicting a flow path that fluids may take as they circulate throughout the inside the embalming machine.

Like reference symbols in the various drawings indicate like elements.

DETAILED DESCRIPTION

Embalming machines are often used to employ embalming techniques to prepare a cadaver for burial, which typically involves a process by which blood and bodily fluids are removed from the cadaver and replaced with an embalming fluid. Despite the several societal benefits that an embalming process may provide, including restoring the cadaver's appearance and delaying decay to allow time to arrange for a funeral and transport of the cadaver to a burial site, there exists several shortcomings in the maintenance required of the embalming machine between each embalming process. As such, there is a need for a more efficient system to ready the embalming machine for the next cadaver. Accordingly, and as will be discussed below, embalming machine 100 may at least help promote cleanability of a reservoir and efficient mixing techniques of e.g., embalming fluids.

Figure 1:
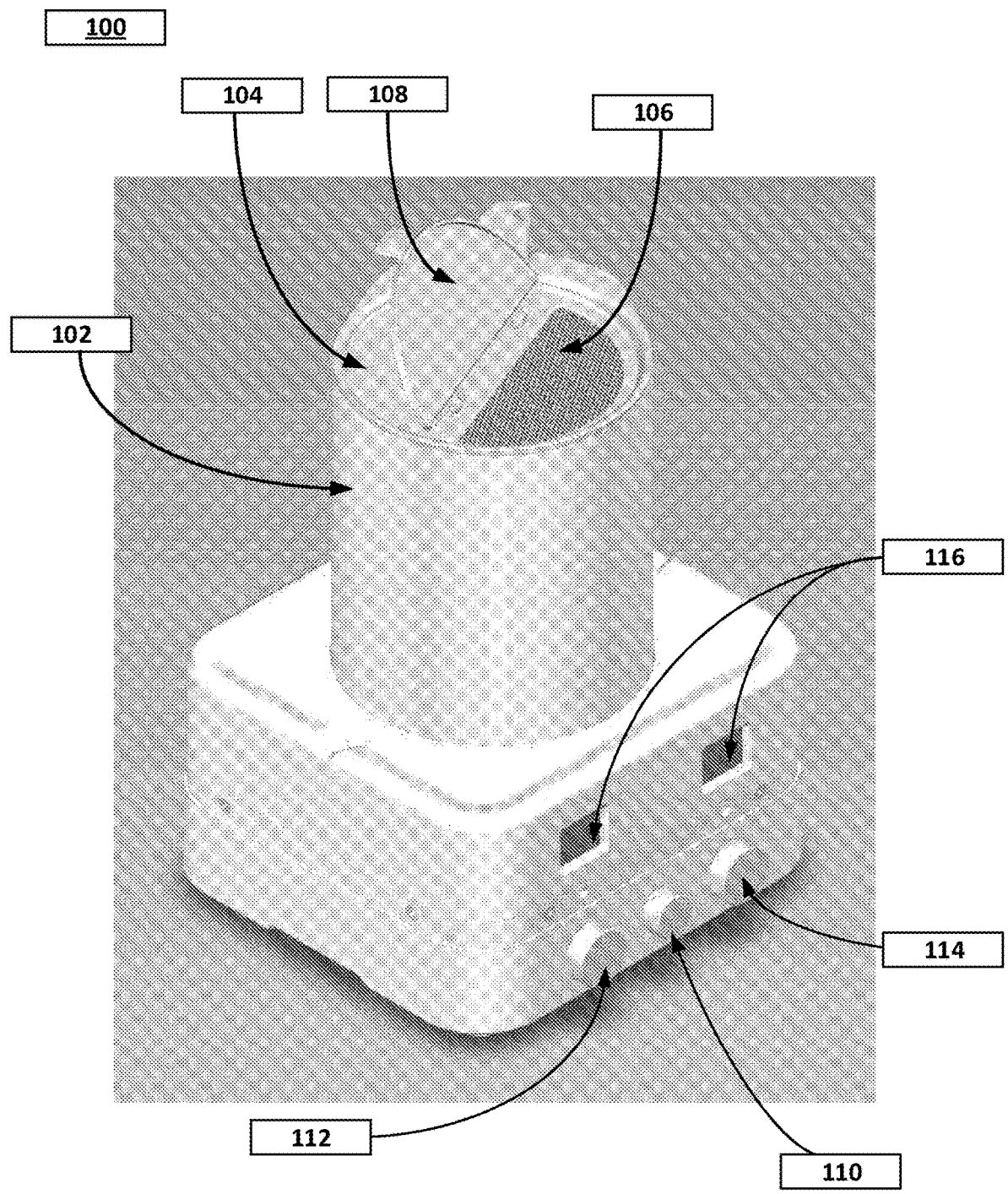
FIG. 1 is an illustrative example of an embalming machine according to one or more example implementations of the disclosure.
Figure 2:
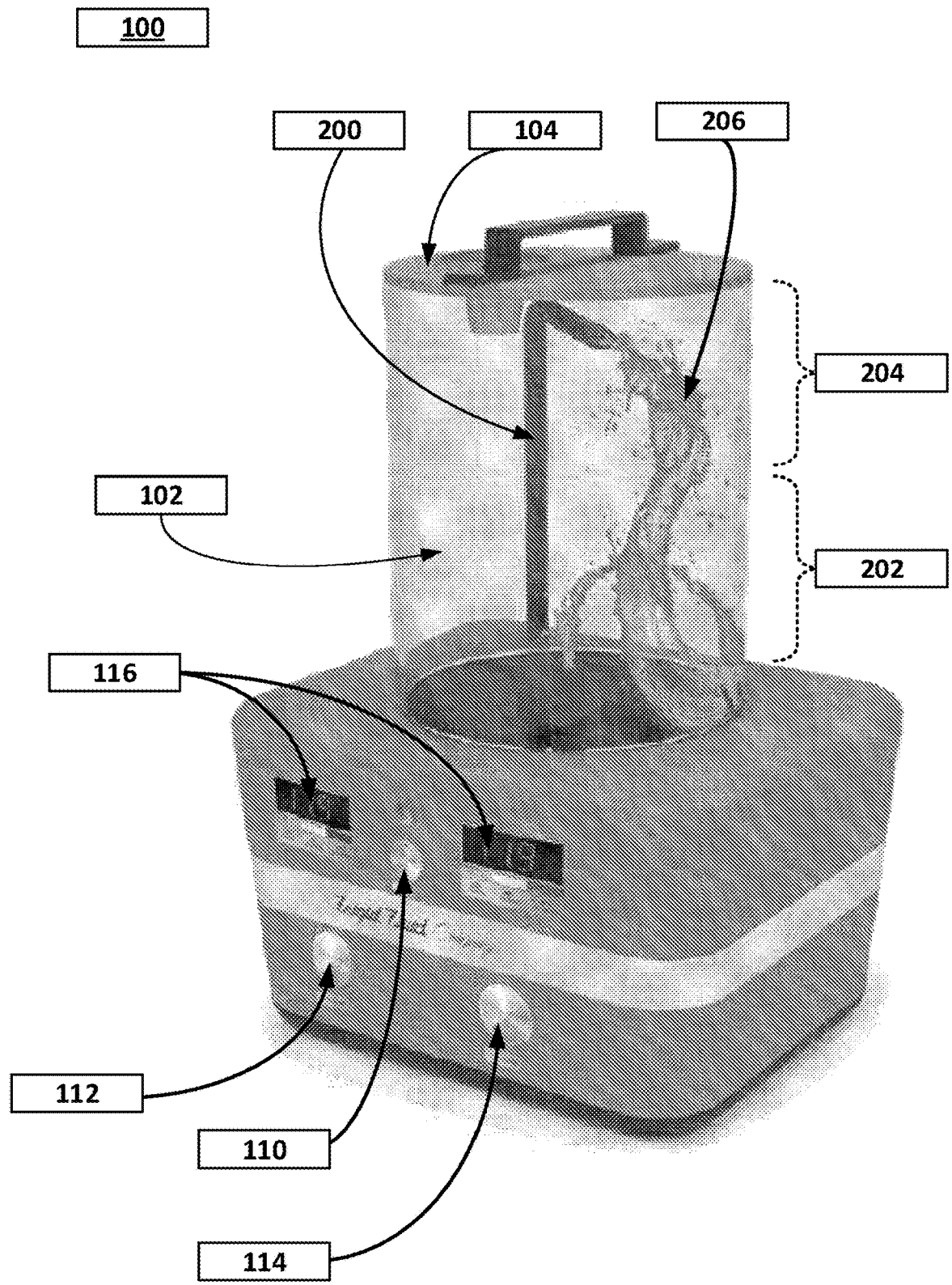
FIG. 2 is an illustrative example of the embalming machine of FIG. 1 according to one or more example implementations of the disclosure.

As generally discussed above, and referring also at least to the example implementations of FIGS. 1-4, an example embalming machine 100, such as the embalming machine 100 of FIG. 1, may generally include a reservoir 102. Embalming machine 100 may also include a tube 200 extending from lower portion 202 to upper portion 204 of reservoir 102, wherein tube 200 may provide a pathway for fluid 206 to travel to reservoir 102. Embalming machine 100 may include a port 300 connected to and/or associated with an end of tube 200 adjacent to upper portion 204 of reservoir 102, wherein port 300 may be configured to dispense fluid 206 traveling through tube 200 and into an interior of reservoir 102.

As generally described above, in some implementations, embalming machine 100 may include reservoir 102. For example, and referring at least to the example implementation of FIG. 1, an example embalming machine 100 is shown. For example, embalming machine 100 may include reservoir 102 (e.g., container, tank, basin, bin, tub, bucket, etc.) for collecting (i.e., receiving and/or containing), mixing, and dispensing fluids. In some particular example embodiments, reservoir 102 may be generally cylindrical, however other shapes and/or configurations may additionally and/or alternatively be utilized. As will be further discussed in greater detail below, and referring at least to the example implementation of FIGS. 3-4, the cylindrical shape of illustrative example reservoir 102 may promote efficient cleaning and mixing techniques by inducing a generally centrifugal motion 302 during fluid injection. As will also be further discussed in greater detail below, and referring at least to the example implementation of FIG. 4, reservoir 102 may include a hydrophobic surface 400, which may additionally contribute to the promotion of efficient cleaning and mixing techniques.

In some implementations, embalming machine 100 may include tube 200 extending from lower portion 202 to upper portion 204 of reservoir 102, wherein tube 200 may provide a pathway for fluid 206 to travel to reservoir 102. For example, and referring at least to the example implementation of FIG. 2, tube 200 may extend upwardly (e.g., ascending diagonally, and/or vertically) along a side of reservoir 102 between lower portion 202 and upper portion 204 of reservoir 102. For example, tube 200 may stem from the bottom of reservoir 102, but may not necessarily be positioned at the absolute bottom of reservoir 102. Similarly, tube 200 may peak at the top of reservoir 102, but may not necessarily be positioned at the absolute top of reservoir 102. Consistent with various example embodiments, the tube may generally be disposed on the exterior of the reservoir, and/or may be disposed at least partially within the reservoir. Other configurations are possible as well without departing from the scope of the disclosure. It will be appreciated that fluid 206 may include various types of liquids (e.g., embalming fluid, cleaning solutions, and/or water, etc.) as required by the particular settings selected on embalming machine 100, and/or based on a particular application or use for a particular process (e.g., accomplishing an embalming function, cleaning the embalming machine, etc.). For example, and as will be discussed in greater detail below, when embalming machine 100 is set to a clean mode (e.g., which may at least in part be intended to clean the reservoir, to clean one or more fluid passages, pumps, etc., associated with the embalming machine, or the like), fluid 206 may be dispensed into reservoir 102 via a port 300 and/or access hatch 106 and may include various cleaning solutions and/or water. In a corresponding manner, when embalming machine 100 is set to a mix mode, fluid 206 may be dispensed into reservoir 102 via port 300 and/or access hatch 106 and may include various types of embalming fluid and/or water.

Figure 5:
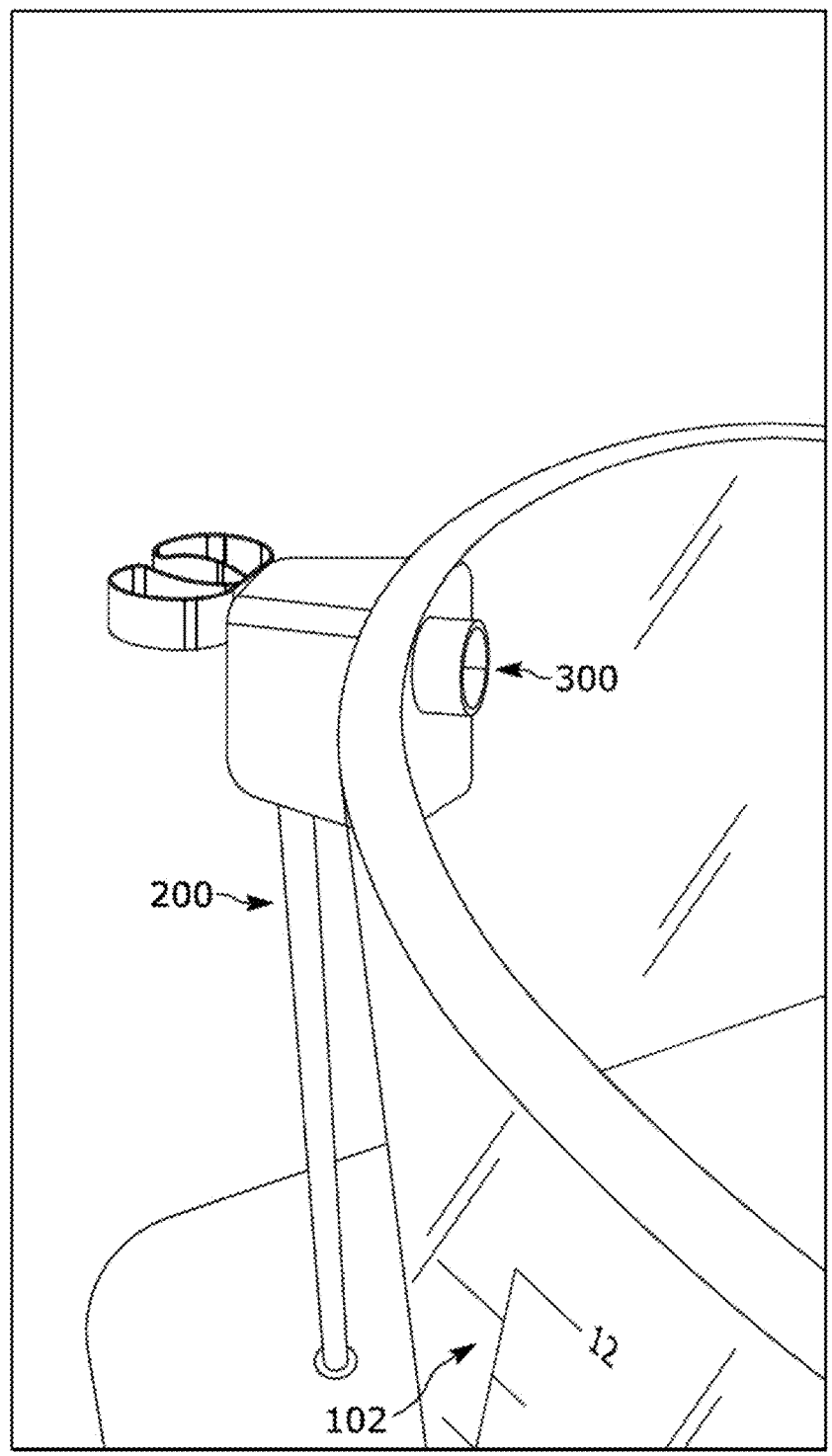
FIG. 5 is an illustrative example of the embalming machine of FIG. 1 depicting a particular example embodiment of a port integrated into a side wall of a reservoir according to one or more example implementations of the disclosure.

In some implementations, embalming machine 100 may include a port 300 connected to and/or associated with an end of tube 200 adjacent to upper portion 204 of reservoir 102, wherein port 300 may be configured to dispense fluid 206 traveling through tube 200 and into an interior of reservoir 102. Consistent with various embodiments, the port may include a separate component that may be in fluid communication with the tube, may include a feature associated with (e.g., coupled with, integrally formed with, etc.) the reservoir, and/or may include a feature of the tube itself (such as an integrally formed feature of the tube, an opening in the tube, or the like). For example, and referring at least to the example implementation of FIGS. 2-3, tube 200 may provide a pathway for fluid 206 to travel to reservoir 102, such that fluid 206 may be pumped through tube 200 by embalming machine 100 and dispensed from port 300 into reservoir 102. It will be appreciated that the tube may be coupled with various known features within the embalming machine, such as pumps, pressure regulators, valves, flow directors, as well as other fluid passages (e.g., other tubes, conduits, or the like) within the embalming machine. As will be described in further detail below, fluid 206 may travel through tube 200 (e.g., via other known features of an embalming machine, such as one or more pumps, etc., as generally referenced above) and may be dispensed generally tangentially to an interior surface of reservoir 102, thereby directing fluid 206 to flow in a generally centrifugal motion (i.e., "whirlpool" behavior) around the interior of reservoir 102. In some particular example embodiments, and now referring at least to the example implementation of FIG. 5, port 300 may be fastened to, and/or otherwise maintained in relation to, a side wall of reservoir 102, such that fluid 206 may be dispensed from an inner surface of reservoir 102 (e.g., the initial flow of the fluid may generally be via a port extending through at least a portion of a wall of the reservoir, to be dispensed along an inner surface of the reservoir), e.g., rather than from overhead (i.e., via a port extending over a top edge of reservoir 102, e.g., as generally shown in the example embodiment depicted in FIG. 3). Other configurations may be possible as well without departing from the scope of the disclosure In some implementations, port 300 may be positioned to dispense fluid 206 into the interior of reservoir 102 to flow in a generally centrifugal motion 302 around the interior of reservoir 102. For example, as generally discussed above and again referring at least to the example implementations of FIGS. 3-4, port 300 may be positioned to direct the flow of fluid generally tangentially to an inner surface of reservoir 102 such that when fluid 206 is dispensed from port 300, fluid 206 may be directed to flow in a generally centrifugal motion 302 (i.e., "whirlpool" behavior) around the interior of reservoir 102. It will be appreciated that a completely tangential flow of fluid is not necessary to achieve the generally centrifugal motion of the fluid around the interior of the reservoir. For example, and as is known in the art, centrifugal motion is an inertial force acting on a body when viewed in a rotating frame of reference such that it creates a radially outward force on the body when the body is moving in a curved path around another body. In a corresponding manner, because port 300 may be positioned generally tangentially to the interior of reservoir 102 (i.e., to provide a generally tangential flow of fluid entering the reservoir via the port, relative to the interior surface of the reservoir), such that when fluid 206 is dispensed from port 300 it may be directed to make contact with the inner surface and cylindrical nature of reservoir 102, fluid 206 may consequently experience a generally centrifugal motion 302 and follow a radial flow path around the interior of reservoir 102. Consistent with some such implementations, the generally centrifugal flow of the fluid around the interior of the reservoir may facilitate the fluid "washing around" the interior of the reservoir. As such, the fluid cause a dynamic action relative to the interior wall or surface of the reservoir, which may, at least in part, aid in cleansing the interior surface of the reservoir of any fluid, residue, or other matter on the interior surface of the reservoir. Other configurations surrounding the positioning of port 300 relative to the inner surface of reservoir 102 may be possible to achieve the centrifugal motion of fluid 206 without departing from the scope of the disclosure.

In some implementations, at least a portion of the interior of reservoir 102 may include a hydrophobic surface 400. For example, and again referring at least to the example implementation of FIG. 3-4, reservoir 102 may be entirely or partially made from one or more hydrophobic materials having inherently hydrophobic properties. For example, reservoir 102 may be made of a hydrophobic material, such as, e.g., borosilicate glass, which may be configured to minimize staining or build-up on the surface of reservoir 102 (e.g., the surface of the borosilicate glass may be at least partially hydrophobic and/or may reduce filming or coating by some and/or many liquids). In some particular embodiments, reservoir 102 may be constructed in such a way that only an inner surface of reservoir 102 is coated in a hydrophobic material. For example, the reservoir may include a laminated structure, e.g., in which the interior surface of the reservoir may include borosilicate glass and the exterior of the reservoir may include another material (e.g., another glass material, a plastic material, or the like). Further, in some implementations, the interior surface of the reservoir may include a surface coating of an at least partially hydrophobic material and/or surface treatment that may render the interior surface at least partially hydrophobic in character. In some such implementations, the reservoir may be formed from any suitable material (e.g., glass, plastic, metal, etc.). Additionally, it will be appreciated that which the interior surface of the reservoir is referenced as being hydrophobic (e.g., being formed including hydrophobic materials, coatings, and/or treatments), in some implementations, only a portion of the interior surface of the reservoir may be hydrophobic, e.g., with at least a portion of the interior surface not being formed from a hydrophobic material, coatings, and/or treatments.

In some implementations, embalming machine 100 may further include a number of selectable settings, wherein the number of selectable settings may include, at least in part, a clean mode and a mix mode. For example, and referring again to at least the example implementations of FIGS. 2-3, in order to promote efficient mixing of fluids and cleanability of reservoir, tube 200 may bring fluid 206 to port 300 adjacent upper portion 204 of reservoir 102, and dispense fluid 206 generally tangentially to an inner surface of reservoir 102. In some particular example embodiments, and as briefly described above, fluid 206 may include various types of liquids (e.g., embalming fluid, cleaning solution and/or water) for mixing and/or cleaning purposes depending on the particular setting selected by a user. For example, and now referring at least to the example implementation of FIG. 6, the user may select from a number of selectable settings via setting knob 110 on embalming machine 100, wherein the number of selectable settings may include, but are not limited to, a mix mode and/or a clean mode. For example, as will be discussed in greater detail below, when a mix mode is selected via setting knob 110, fluid 206 (e.g., embalming fluid and/or water) having a flow rate automatically set to a desired value (and/or set to a desired value by the user), may be transported to upper portion 204 of reservoir 102, dispensed from port 300, and directed to follow a path around the interior of reservoir 102 to induce a centrifugal mixing "whirlpool" behavior (e.g., which may facilitate mixing of the fluid with other liquids, solids, etc., within the reservoir, and/or mixing with other fluids, solids, etc., that may subsequently be added to the reservoir). Similarly, when a clean mode is selected via setting knob 110, fluid 206 (e.g. cleaning solution and/or water) having a flow rate automatically set to a max output of the pump (and/or other set to a desired, manually selected, and/or otherwise defined flow rate) of the embalming machine, may be transported to upper portion 204 of reservoir 102, dispensed from port 300, and directed to follow a path around the interior of reservoir 102 to induce a centrifugal cleaning "whirlpool" behavior. In some particular example embodiments, and referring again to at least the example implementation of FIG. 6, the number of selectable settings on embalming machine 100 that may be selected by a user via setting knob 110 (and/or via other suitable controls and/or user interface) may further include a pulse mode. For example, the pulse mode may induce a "flow-stop-flow-stop-flow-stop" injection pattern when fluid 206 is dispensed from port 300. Consistent with the foregoing example, the "flow-stop-flow-stop-flow-stop" injection pattern may include an injection pattern of 24 pulses per minute (and/or any other suitable defined and/or selected pattern). As will be discussed in greater detail below, the level of intensity experienced by fluid 206 during the pulse mode may be dependent upon a particular flow rate and/or pressure set by the user (e.g., embalmer), and/or otherwise set (e.g., based upon automatic controls, and/or other criteria). In some particular example embodiments, and referring again to at least the example implementation of FIG. 6, the number of selectable settings on embalming machine 100 that may be selected by a user via setting knob 110 may further include an inject mode. For example, when the inject mode is selected, fluid 206 may be transported via tube 200 to upper portion 204 of reservoir 102 and dispensed from port 300 into reservoir 102 at a continuous pressure and flow rate set by the user (and/or automatically set based upon predetermined parameters and/or based upon other criteria).

Figure 6:
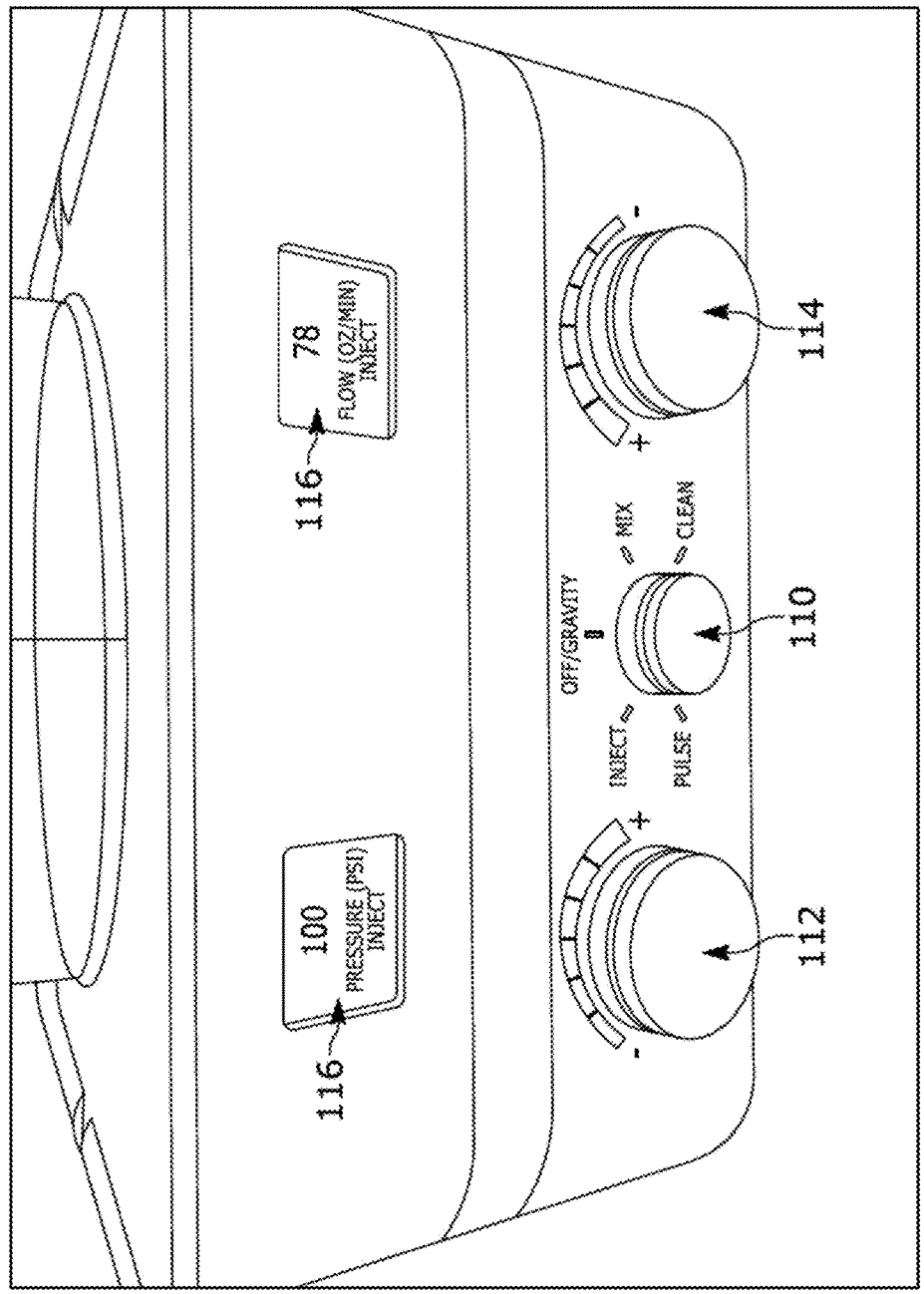
FIG. 6 is an illustrative example of the embalming machine of FIG. 1 depicting a number of selectable settings and respective control knobs according to one or more example implementations of the disclosure.

In some particular example embodiments, and referring again to at least the example implementation of FIG. 6, the number of selectable settings on embalming machine 100 that may be selected by a user via setting knob 110 may further include an off/gravity mode. For example, when the off/gravity mode is selected, a user may be able to continue monitoring and adjusting the pressure and flow rate of fluid 206 (such that fluid 206 may continue to flow through the system and dispense into reservoir 102 even when the motor and pump are turned off), by means of gravity so long as reservoir 102 is filled above an exit point relative to tube 200). In some particular example embodiments, and referring at least to the example implementation of FIG. 6, the number of selectable settings (e.g., inject mode, pulse mode, off/gravity mode, clean mode, and mix mode) may be displayed on embalming machine 100 via one or more display screens 116. For example, when a user selects one of the number of selectable settings, the selected mode may be displayed on any one or multiple display screens. It will be appreciated that one or more display screens 116 may be a digital display screen and/or may include an analog display having a moveable dial (as illustrated in the example embodiment of FIG. 3). Other configurations may be possible within the scope of the disclosure.

In some implementations, fluid 206 may be dispensed from port 300 and into the interior of reservoir 102 at a defined pressure. For example, and as previously discussed above, when a particular mode (e.g., a mix mode or a clean mode) is selected from the number of selectable settings, fluid 206 may be transported to upper portion 204 of reservoir 102, dispensed from port 300 into reservoir 102, and directed to follow a radial path around the interior of reservoir 102 to effectuate efficient mixing of fluids or cleaning of reservoir 102 via a generally centrifugal motion 302 (i.e., "whirlpool" behavior). Consistent with this example, fluid 206 may be dispensed from port 300 at a defined pressure that may be automatically set to an optimal value. In some particular example embodiments, the preferred value of the defined pressure may be set to a pressure unit rate of 100 pounds per square inch (psi). In some implementations, rather than being automatically set, the pressure and/or flow rate of the fluid may be manually selected by the user, and/or may otherwise be defined and/or determined.

In some implementations, fluid 206 may be dispensed from port 300 and into the interior of reservoir 102 at a defined flow rate. For example, and as previously discussed above, when a particular mode (e.g., mix mode or a clean mode) is selected from the number of selectable settings, fluid 206 may be transported to upper portion 204 of reservoir 102, dispensed from port 300 into reservoir 102, and directed to follow a path around the interior of reservoir 102 to effectuate efficient mixing of fluids or cleaning of reservoir 102 via a generally centrifugal motion 302 (i.e., "whirlpool" behavior). Consistent with this example, fluid 206 may be dispensed from port 300 at a defined flow rate that may be automatically set to a desired value. In some particular example embodiments, the defined flow rate may be automatically set to a volumetric flow rate, such as, e.g., 1 gallon per minute (gpm). In some particular example embodiments, the value of the defined flow rate of fluid 206 may be about 128 oz./minute. In addition/as an alternative to being automatically set, the flow rate may be manually set by a user and/or may be otherwise defined and/or determined.

In some implementations, embalming machine 100 may further include at least a second tube 304 projecting into lower portion 202 of reservoir 102, wherein at least second tube 304 may be configured to inject (and/or extract) fluid 206 (and/or one or more similar and/or different fluids) into (and/or from) the interior of the reservoir 102. In various implementations, the second tube 304 may extend from within the interior of the reservoir (e.g., from a bottom of the reservoir) and/or may extend through a sidewall of the reservoir adjacent the lower portion of the reservoir, and/or may extend from an upper portion of the reservoir (e.g., either down from a top of the reservoir and/or through a sidewall of the reservoir) down to the lower portion of the reservoir. For example, as discussed above and also referring at least to the example implementation of FIG. 3, at least a second tube 304 may be projected from inside lower portion 202 of reservoir 102, wherein the at least second tube 304 may be configured to inject water into reservoir 102 for additional mixing and/or cleaning activation depending on the mode (e.g., clean mode or mix mode) selected by a user from the number of selectable settings, and/or may extract fluid from within the reservoir.

In some implementations, embalming machine 100 may further include a reservoir lid 104 configured to at least partially enclose upper portion 204 of reservoir 102, wherein reservoir lid 104 may include access hatch 106 integrated into reservoir lid 104. For example, and referring again to at least the example implementations of FIGS. 1-3, embalming machine 100 may include reservoir lid 104, which may be configured to fit around a periphery of an exposed opening in a top of upper portion 204 of reservoir 102. In some particular example embodiments, reservoir lid 104 may be configured to at least partially enclose the exposed opening in upper portion 204 of reservoir 102. Further, in some example embodiments, reservoir lid 104 may include access hatch 106 integrated into reservoir lid 104, wherein access hatch 106 may be configured to partially expose the interior of reservoir 102 to an external environment, which maintains reservoir lid 104 in position (e.g., thereby at least partially enclosing the remaining of the upper portion of the reservoir). Consistent with the foregoing example, and as will be explained in greater detail below, access hatch 106 may enable user to add various types of fluids (e.g., embalming fluid, cleaning solutions, and/or water, etc.) to reservoir 102 by directly pouring the fluids through access hatch 106, e.g., without necessitating removal of reservoir lid 104. Consistent with such a configuration, the reservoir may remain at least partially enclosed by reservoir lid during such addition of fluids through the access hatch. For example, while embalming machine 100 is in use (i.e., during embalming process), a user may be able to add various types of fluids to reservoir 102 when it is empty or may mix the various fluids with existing fluid already inside (i.e., in similar concept to a food processor). As such, access hatch 106 may contribute to the efficient mixing of various fluids in reservoir 102 as well as cleaning of the interior of reservoir 102 without necessitating the removal of reservoir lid 104. Consequently, access hatch 106 may reduce the amount (and/or slow the release) of fumes that may otherwise escape from reservoir 102 if reservoir 102 were entirely exposed to the external environment.

In some implementations, and referring also at least to the example implementation of FIGS. 1-6, a method for mixing of fluids in embalming machine 100 may include selecting a mix mode from a number of selectable settings on embalming machine 100. For example, a user may select from a number of selectable settings throughout the embalming process, wherein the number of selectable settings may be selected via setting knob 110 (and/or via other suitable selection interfaces and/or controls). For example, the number of selectable settings may labeled on embalming machine, and more specifically positioned around setting knob 110, such that the user may turn setting knob 110 in the direction of the desired setting until a dial on setting knob 110 aligns with the desired setting to activate the respective mode.

In some implementations, embalming machine 100 may include reservoir 102. For example, and continuing with the above-described illustrative example implementation of FIG. 3, fluid 206 may travel through tube 200 and be dispensed into reservoir 102 from port 300 positioned in association with tube 200. In some particular example embodiments, and referring at least to the example implementation of FIG. 4, reservoir 102 may be entirely made of materials having hydrophobic and/or oleophobic properties and/or at least a portion of an interior of the reservoir may include hydrophobic and/or oleophobic properties (e.g., by virtue of including suitable materials, coatings, and/or surface treatments). For example, reservoir 102 may be both water and oil repellent (i.e., hydrophobic and oleophobic, respectively), such that the surface of reservoir 102 may be both easy to clean as fluids are deterred from adhering to reservoir 102, and promotes ease of movement for fluid 206 to freely flow around the interior of reservoir 102, e.g., which may facilitate removal and/or washing off of residues and/or foreign material that may reside on the interior surface of the reservoir. Consistent with some examples, only the interior (e.g., hydrophobic surface 400) of reservoir 102 may be inherently hydrophobic and/or oleophobic.

As generally discussed above, in some implementations, embalming machine 100 may include tube 200 extending from lower portion 202 to upper portion 204 of reservoir 102, wherein tube 200 may provide a pathway for fluid 206 to travel to reservoir 102. For example, and referring at least to the example implementations of FIGS. 2-3, tube 200 may be positioned to extend upwardly along an exterior side of reservoir 102. In a corresponding manner, in some embodiments, tube 200 may be configured to extend upwardly along an interior side of reservoir 102. Other configurations may be possible as well without departing from the scope of the disclosure.

In some implementations, embalming machine 100 may include port 300 in fluid communication with tube 200 adjacent to upper portion 204 of the reservoir 102. For example, and again referring at least to the example implementations of FIGS. 2-3, port 300 may be connected to an end of tube 200 adjacent to upper portion 204 of the reservoir 102, and may be configured to dispense fluid 206 into reservoir 102. In some particular example embodiments, and referring now to at least the example implementation of FIG. 3, port 300 may extend over the top of reservoir 102 and through a port hole 306 (i.e., respective cut-out/opening) in reservoir lid 104 so that port 300 may dispense fluid 206 into the interior of reservoir 102. Various additional and/or alternative features, arrangements, and/or aspects have been previously described, and will be understood from such description.

In some implementations, the method may further include dispensing fluid 206 from port 300 and into the interior of reservoir 102, wherein port 300 may be positioned to dispense fluid 206 into the interior of reservoir 102 to flow in a generally centrifugal motion 302 around the interior of reservoir 102. For example, and as previously discussed above, tube 200 may provide a pathway for fluid 206 to travel to reservoir 102, such that fluid 206 may be pumped through tube 200 and dispensed from port 300 into reservoir 102. For example, and referring at least to the example implementation of FIGS. 3-4, port 300 may be positioned generally tangentially to an interior surface of reservoir 102 such that when fluid 206 is dispensed from port 300, fluid 206 may be directed with enough force to flow in a generally centrifugal motion 302 (i.e., "whirlpool" behavior) around the interior of reservoir 102.

Figure 7:
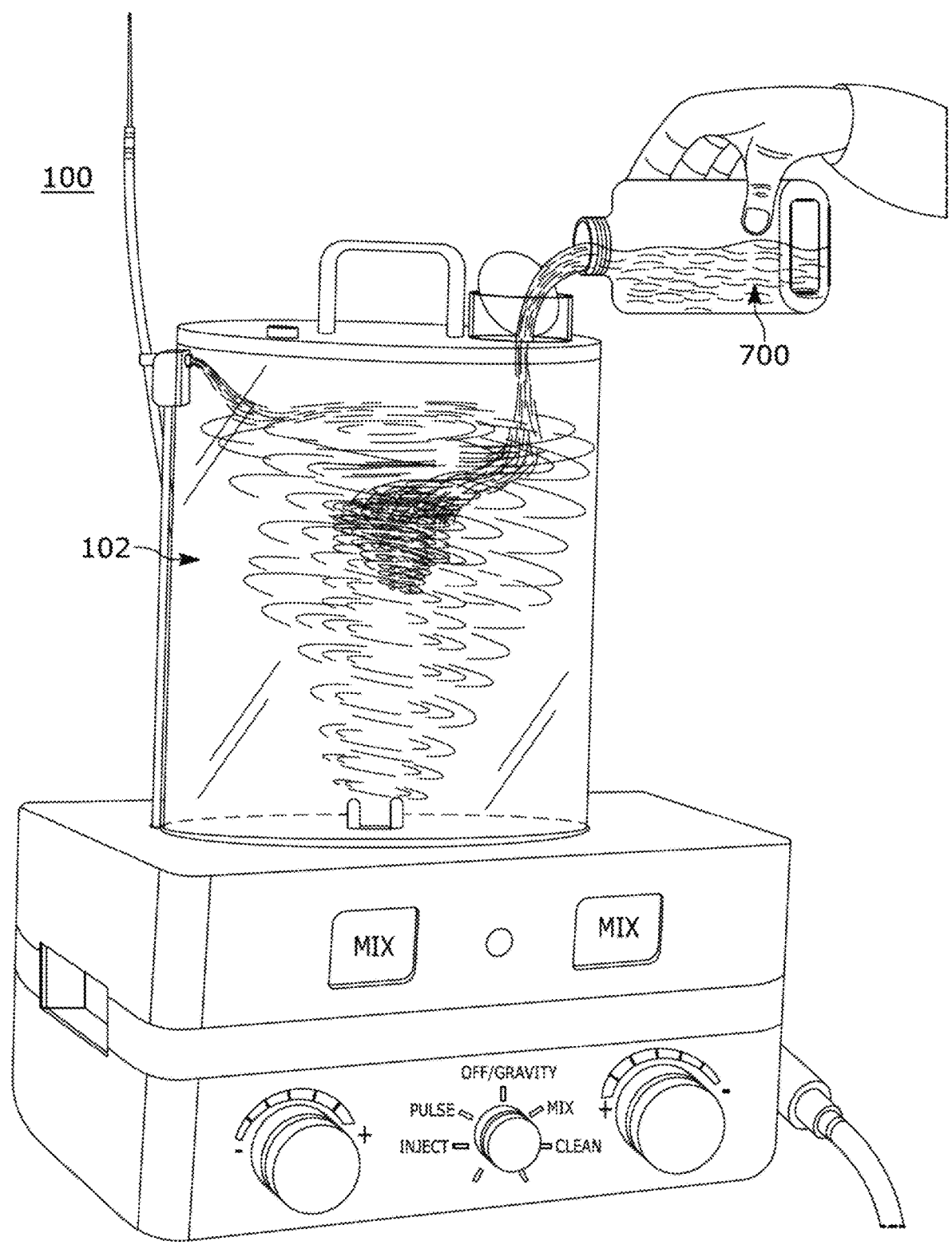
FIG. 7 is an illustrative example of an embalming machine of FIG. 1 depicting a method of mixing fluids in a reservoir according to one or more example implementations of the disclosure.
Figure 8:
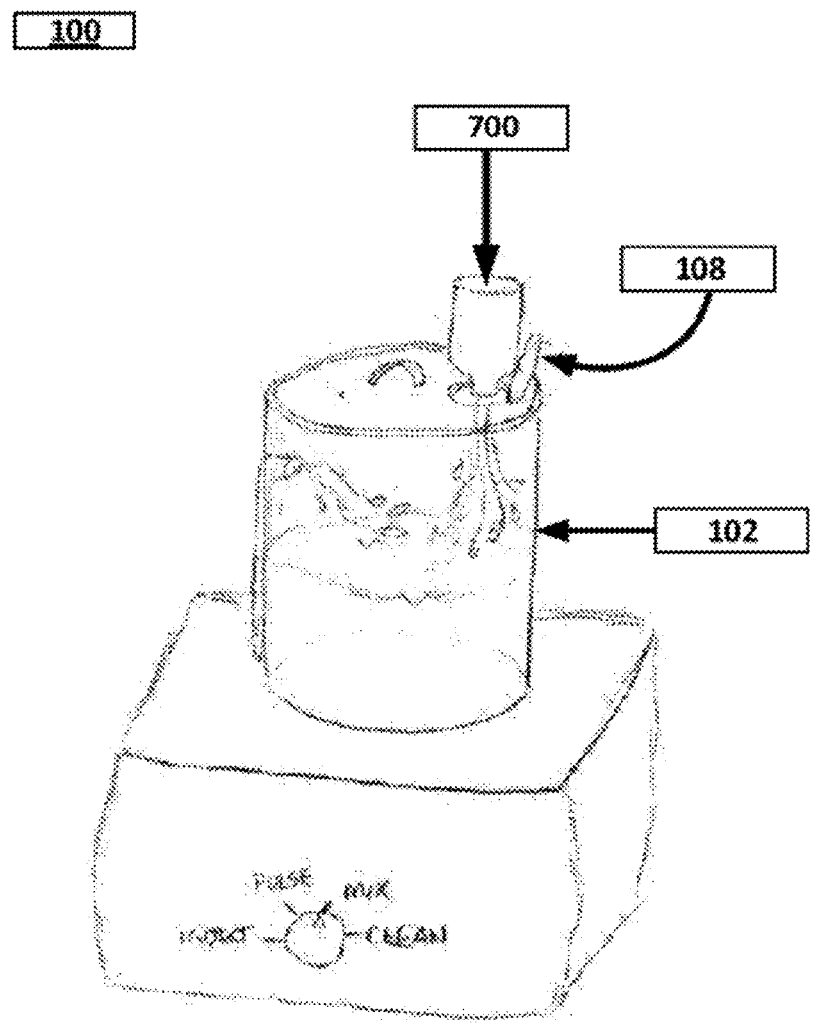
FIG. 8 is an example demonstrative sketch of the embalming machine of FIG. 7 depicting a method of mixing fluids in the reservoir according to one or more example implementations of the disclosure.
Figure 9:
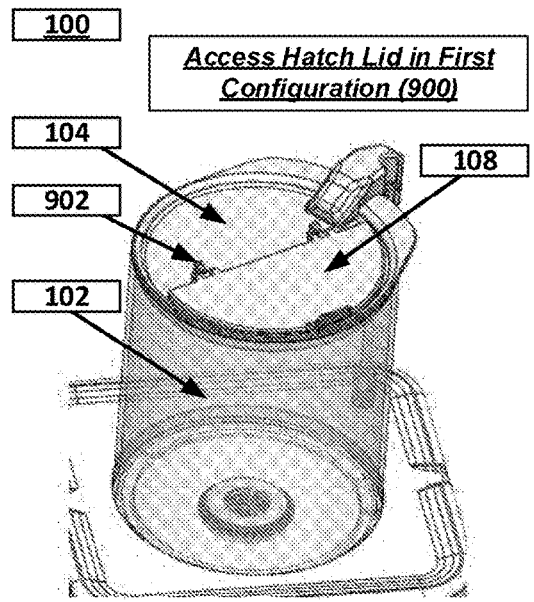
FIG. 9 is a top view of the illustrative example of the embalming machine of FIG. 1 depicting an access hatch lid in a first configuration.
Figure 10:
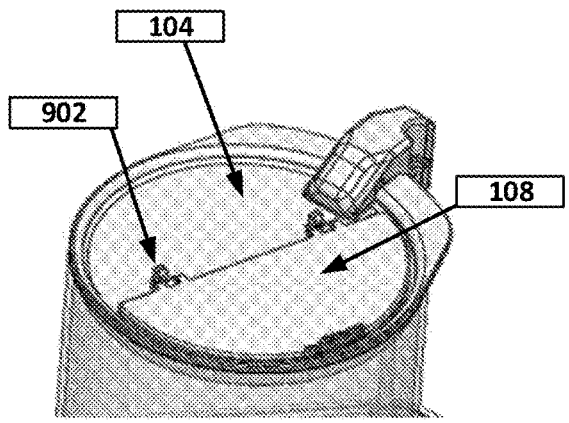
FIG. 10 is a top view of the illustrative example of the embalming machine of FIG. 9 depicting a closed position of the access hatch lid in the first configuration.
Figure 12:
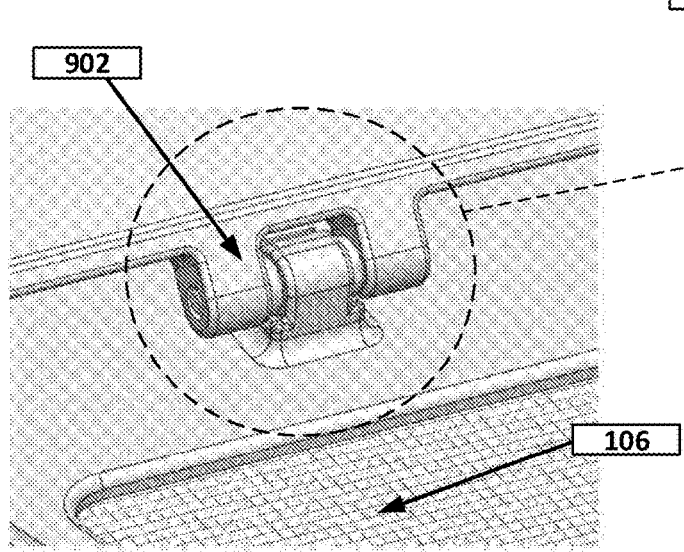
FIG. 12 is an illustrative example of the embalming machine of FIG. 9 depicting a magnified view of the access hatch lid in a first configuration respective to a hinge connection between the access hatch lid a reservoir lid.
Figure 11:
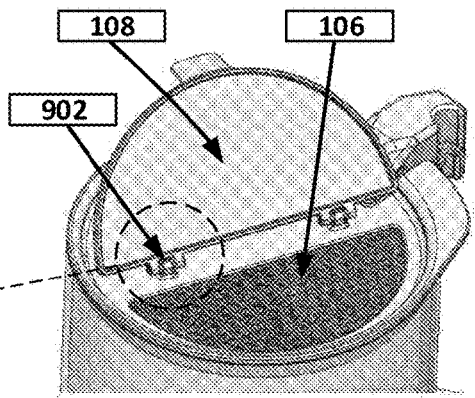
FIG. 11 is an illustrative example of the embalming machine of FIG. 9 depicting an open position of the access hatch lid in a first configuration.

In some implementations, the method may further include pouring at least a second fluid 700 into the interior of reservoir 102 through access hatch 106 integrated into reservoir lid 104, wherein reservoir lid 104 may be configured to at least partially enclose upper portion 204 of the reservoir 102. For example, and as previously discussed above, fluid 206 may be pumped through tube 200 and dispensed from port 300 into reservoir 102. In some particular example embodiments, fluid 206 may be directed to flow in a generally centrifugal motion 302 around the interior of reservoir 102 because of the generally tangential positioning of port 300 relative to an interior surface of reservoir 102. Consistent with the present example, and now referring to at least the example implementation of FIGS. 7-8, at least second fluid 700 may be poured into reservoir 102 via access hatch 106 (e.g., generally during the generally centrifugal motion of the fluid entering the reservoir via the tube), and mixed with the existing fluid 206 in reservoir 102 via centrifugal motion 302. As such, multiple fluids may added to reservoir 102 from port 300 and access hatch 106 during the embalming process without necessitating the need to remove reservoir lid 104.

Figure 3:
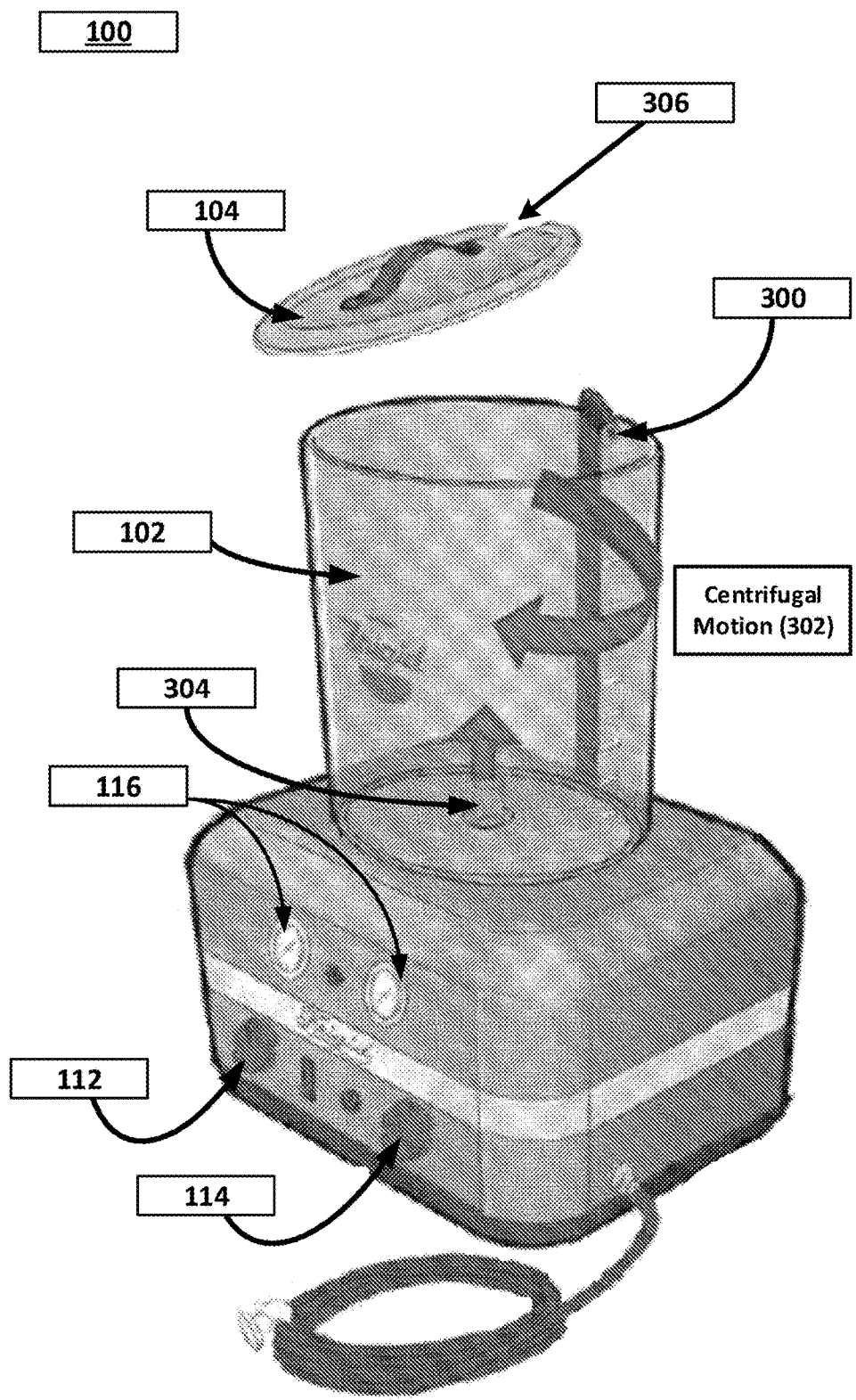
FIG. 3 is an illustrative example of the embalming machine of FIG. 1 depicting a generally centrifugal motion according to one or more example implementations of the disclosure.
Figure 4:
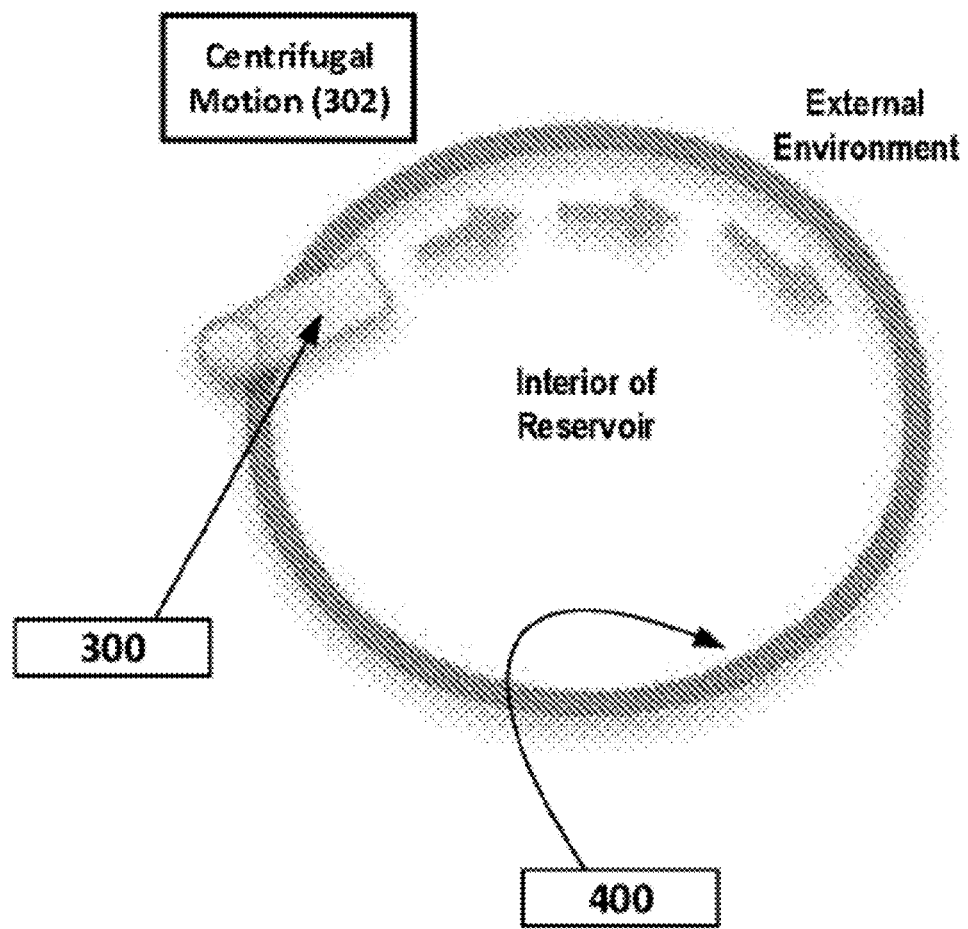
FIG. 4 is an example diagrammatic view of the generally centrifugal motion within a reservoir of the embalming machine of FIG. 3 according to one or more example implementations of the disclosure.

In some implementations, and referring again to at least the example implementation of FIG. 3, the method may further include injecting fluid 206 (and/or one or more similar and/or different fluids) into the interior of reservoir 102 from at least second tube 304 projecting from inside of lower portion 202 of reservoir 102 (and/or otherwise positioned and/or arranged to have an opening generally adjacent to the lower portion of the reservoir, as generally described above). For example, fluid 206 (and/or more than one similar or different fluids) may be dispensed from port 300 and injected from at least second tube 304 into reservoir 102 (e.g., at generally the same time, during at least partially overlapping time periods, and/or at different times) during an embalming process. For example, and as will be explained in more detail below, embalming machine 100 may include a hydraulic pressure regulator and/or more than one hydraulic pressure regulators configured to adjust and regulate the pressure of fluid 206 (and/or of one or more additional and/or alternative fluids). In some implementations, now also referring to at least the example implementations of FIGS. 15-19, embalming machine 100 may further include a bypass loop relative to the hydraulic pressure regulator, wherein the bypass loop may be configured to continuously reroute fluid 206 back into reservoir 102 through at least second tube 304 via the hydraulic pressure regulator; of which may include a built-in pressure relief bypass. In some particular example embodiments, and referring at least to the example implementation of FIG. 17, fluid 206 in reservoir 102 may be sucked (i.e., pumped) back into at least second tube 304 via a pump outlet, rerouted by the bypass loop to a mix solenoid circuit and directed to travel up tube 200 to be dispensed out of port 300 and into reservoir 102. In some particular example embodiments, and referring at least to the example implementation of FIG. 18, fluid 206 may leave the pump outlet and be routed through the hydraulic flow valve followed by a ultra-sonic flow sensor to a quick-disconnect (where an inject hose plugs into on the side of embalming machine 100). Additionally, the ultra-sonic flow sensor may e.g., be configured to process the flow in real-time, and send that data (e.g., flow rate) to a circuit board of which may signal for the data to be displayed on the one or more display screens 116. Referring at least to the example implementation of FIG. 19, it will be appreciated that depending upon the defined pressure set by a user (i.e., high or low), there may be less fluid 206 leaving the reservoir and more fluid 206 in circulation within the system. For example, as a user turns the pressure regulator knob 112, the pressure of the fluid in the system may increase or decrease. Accordingly, the position of the pressure regulator knob 112 may be proportional to the amount of bypass fluid going back to reservoir 102 and pumped through the system (e.g., to increase pressure: less fluid goes through the bypass route; and to decrease pressure: more fluid goes through the bypass route).

In some implementations, and as generally described above, at least a portion of the interior of reservoir 102 may include hydrophobic surface 400. For example, reservoir 102 may be specially treated with a hydrophobic surface treatment to bond a hydrophobic material to the surface of reservoir 102 to create a hydrophobic coating. Consistent with the foregoing example, the hydrophobic coating may be applied to at least a portion of the surface of reservoir 102 using a spray that may be buffed on and then left to dry (e.g., depending upon the coating material, for at least 24 hours, and/or another suitable time period). Similarly, it may be possible to effectively treat all of the hydraulic components of embalming machine 100 with the hydrophobic surface treatment so that all of the hydraulic components are resistant to staining, build-up, and deposits of debris from various fluids or oils. It will be appreciated that additional and/or alternative approaches may be utilized for providing a hydrophobic and/or oleophobic surface character to at least a portion of the interior of the reservoir and/or to one or more aspects of the embalming machine.

In some implementations, fluid 206 may be dispensed from port 300 and into the interior of reservoir 102 at a defined pressure. For example, and referring at least to the example implementations of FIGS. 1-3 and FIG. 6, embalming machine 100 may include pressure regulator knob 112 (and/or another pressure control interface). As briefly discussed above, and referring again to at least the example implementation of FIG. 19, the pressure of fluid 206 may be controlled (i.e., adjusted and regulated) via a hydraulic pressure regulator. It will be appreciated that the hydraulic pressure regulator may include a pressure relief valve configured to regulate the pressure or execute the adjustments. Consistent with the foregoing example, a user may manipulate the hydraulic pressure regulator responsible by turning pressure regulator knob 112 (i.e., to raise or to lower the pressure), such that the amount of fluid 206 that may be introduced to the reservoir 102 (i.e., dispensed from port 300 and/or injected from at least second tube 304) for additional cleaning motion may be controlled.

In some implementations, fluid 206 may be dispensed from port 300 and into the interior of reservoir 102 at a defined flow rate. For example, and referring at least to the example implementations of FIGS. 1-3 and FIG. 6, embalming machine 100 may include flow knob 114 (and/or other suitable flow control interface). Consistent with the foregoing example, a user may manipulate the flow rate (i.e., speed) of fluid 206 by turning the flow knob 114 (i.e., to increase or decrease the speed of fluid 206 traveling through e.g., tube 200). It will be appreciated that a pump motor speed respective to embalming machine 100 may be controlled by a micro controller (not shown) on a motor speed control board (not shown) configured to send a signal to a driver (not shown), the driver of which may then send a signal to a motor (not shown) to either increase or decrease the motor speed. In a corresponding manner, as the motor speed is signaled to increase, the speed at which fluid 206 is pumped through the system increases proportionally.

In some implementations, and referring also at least to the example implementations of FIGS. 1-6, a method for cleaning fluids in embalming machine 100 may include selecting a clean mode from a number of selectable settings on embalming machine 100. For example, and as generally discussed above, a user may select from a number of selectable settings throughout the embalming process, wherein the number of selectable settings may be labeled on embalming machine, and more specifically positioned around setting knob 110 (and/or via another suitable selection interface), such that the user may turn setting knob 110 in the direction of the desired setting until a dial on setting knob 110 aligns with the desired setting to activate the respective mode. For example, to select the clean mode, a user may turn setting knob 110 in the direction of the clean mode until the dial meets the notation for clean mode.

In some implementations, embalming machine 100 may include reservoir 102. For example, and referring at least to the example implementation of FIG. 3, fluid 206 may travel through tube 200 and dispense into reservoir 102 from port 300 in fluid communication with tube 200.

In some implementations, embalming machine 100 may include tube 200 extending from lower portion 202 to upper portion 204 of reservoir 102, wherein tube 200 may provide a pathway for fluid 206 to travel to reservoir 102. In some implementations, and again referring at least to the example implementation of FIG. 2, tube 200 may provide a pathway for fluid 206 to travel to reservoir 102. For example, fluid 206 may be pumped (via embalming machine 100) through tube 200 and dispensed into reservoir 102. Additional features and/or implementations have been described above, and may be equally utilized.

In some implementations, embalming machine 100 may include port 300 in fluid communication with tube 200 adjacent to upper portion 204 of reservoir 102. In some particular example embodiments, port 300 may be customized/customizable. For example, port 300 and/or at least a portion of tube 200 may be customized to bend at various angles and/or to have a crimped end ranging in various widths. It will be appreciated that by customizing the port and/or at least a portion of the tube, various flow characteristics of the fluid entering the reservoir via the tube and the port may be altered (e.g., angle of the stream of fluid entering the reservoir may be changed, the relative pressure of the stream of fluid entering the reservoir may be changed, and the like). For example, in a particular illustrative example embodiment, port 300 may be customized to have a crimped end, e.g., with an opening measuring approximately 0.12 inches wide, and/or another selected dimension. It will be appreciated that, consistent with some implementations, by bending tube 200 and/or port 300 and/or crimping an end of port 300 through which fluid 206 is dispensed, there may be a realized advantage of reducing the production of air bubbles in the water line and particularly those in e.g., tube 200. It will be appreciated that various additional and/or alternative features, advantages, and/or characteristics may be achieved by varying one or more of the angle of the port and/or the tube, the opening dimension of the port, etc.

In some implementations, the method may further include dispensing fluid 206 from port 300 and into an interior of reservoir 102, wherein port 300 may be positioned to dispense fluid 206 into the interior of reservoir 102 to flow in a generally centrifugal motion 302 around the interior of reservoir 102. For example, and as previously discussed above, tube 200 may provide a pathway for fluid 206 to travel to reservoir 102, such that fluid 206 may be pumped through tube 200 and dispensed from port 300 into reservoir 102 with enough inertial force to flow in a generally radial path around the interior of reservoir 102.

In some implementations, the method may further include pouring at least a second fluid 700 through access hatch 106 integrated into reservoir lid 104, wherein reservoir lid 104 may be configured to at least partially enclose upper portion 204 of reservoir 102. For example, and as previously discussed above and referring at least to the example implementation of FIGS. 7-8, at least second fluid 700 may be poured into reservoir 102 via access hatch 106 (e.g., during flow of fluid 206 via port 300, at least partially overlapping with flow of fluid 206 via port 300, and/or at another time), and mixed with the existing fluid 206 in reservoir 102 via generally centrifugal motion 302. It will be appreciated that at least second fluid 700 may include various types of embalming fluid, cleaning solutions, and/or water as required by the selected mode (e.g., clean mode, mix mode, etc.) on embalming machine 100. For example, during clean mode, at least second fluid 700 may comprise various cleaning solutions and/or water.

In some implementations, the method may further include injecting fluid 206 (and/or another similar and/or different fluid) from at least a second tube 304 projecting from inside of lower portion 202 of reservoir 102 and/or otherwise having an opening adjacent a lower portion of the reservoir, as generally discussed above. For example, and referring at least to the example implementation of FIG. 3, at least second tube 304 may project from an absolute bottom inside lower portion 202 of reservoir 102. However, other configurations may be imagined within the scope of the disclosure such that fluid 206 may be injected into reservoir 102 from any direction, rather than solely injected from the bottom of reservoir 102.

In some implementations, at least a portion of the interior of reservoir 102 may include a hydrophobic surface 400. For example, hydrophobic surface 400 may be both water and oil repellent, such that the hydrophobicity of the surface renders it both easy to clean as deposits and residues left by various liquids, dirt, and even oil, are deterred from naturally adhering to, or smudging, hydrophobic surface 400. In a corresponding manner, hydrophobic surface 400 may also promote ease of movement for fluid 206 to freely flow around the interior of reservoir 102. Various features, aspects, and configurations of such hydrophobic and/or oleophobic surfaces have been described herein.

In some implementations, fluid 206 may be dispensed from port 300 and into the interior of reservoir 102 at a defined pressure. For example, and as generally discussed above, adjusting and/or regulating the hydraulic pressure of fluid 206 may provide additional cleaning or mixing motion by activating an injection of the same and/or a different fluid from at least a second tube 304 projecting from inside lower portion 202 of reservoir 102 (and/or otherwise disposed to dispense fluid adjacent to a lower portion of the reservoir). In some particular example embodiments, and referring at least to the example implementation of FIG. 6, the pressure may be displayed on embalming machine 100 via one or more display screens 116. For example, when the user adjusts the pressure (i.e., turning pressure knob 112 to raise or to lower the pressure, and/or utilizing other control interfaces), the pressure may be displayed on any one or multiple display screens.

In some implementations, fluid 206 may be dispensed from port 300 and into the interior of reservoir 102 at a defined flow rate. In some particular example embodiments, and referring again to at least the example implementation of FIG. 6, the flow rate may be displayed on embalming machine 100 via one or more display screens 116. For example, when a user adjusts the flow rate (i.e., turning flow knob 114 to increase or decrease the flow rate and/or utilizing other control interfaces), the flow rate may be displayed on any one or multiple display screens.

Referring at least to the example implementations of FIGS. 1-4, an example embalming machine 100, such as embalming machine 100 of FIG. 1, may include reservoir 102. Embalming machine 100 may include reservoir lid 104 configured to at least partially enclose upper portion 204 of reservoir 102, wherein reservoir lid 104 may include access hatch 106 integrated into reservoir lid 104. Consistent with the particular illustrative example, embalming machine 100 may include access hatch lid 108 integrated into reservoir lid 104, wherein access hatch lid 108 may be shaped to overlie access hatch 106.

Consistent with some illustrative example embodiments, and as generally mentioned above, embalming machine 100 may include reservoir lid 104, e.g., which may at least partially enclose an opening of reservoir 102 (e.g., such as the top opening of reservoir 102). Further, consistent with some such embodiments, reservoir lid 104 may include access hatch 106, e.g., which may allow at least a portion of reservoir lid 104 to be opened to permit fluid access to reservoir 102 while reservoir lid 104 is in place at least partially enclosing reservoir 102. With reference to the illustrative example embodiment shown in FIGS. 1 and 7-9, in some particular implementations access hatch 106 may be coupled with reservoir lid 104 for pivotal movement between a closed position at least partially covering access hatch 106, and an opened position at least partially exposing access hatch 106 (e.g., to allow fluid communication with the reservoir 102). In some example implementations, reservoir lid 104 may include an at least partially removable hatch lid, e.g., access hatch lid 108 in first configuration 900; which may be removed to provide fluid communication with reservoir 102 via access hatch 106 of reservoir lid 104, e.g., without removing reservoir lid 104. Further, access hatch lid 108 (i.e., in first configuration 900) may be secured relative to the reservoir lid 104 to at least partially close the access hatch 106 to fluid communication with reservoir 102. In some example implementations, reservoir lid 104 may include a disposed protrusion, or basket (i.e., cup, bowl, etc.), e.g., access hatch lid 108 in second configuration 1300; which may depend downwardly from reservoir lid 104 and may be removeably retained in access hatch 106, such that access hatch lid 108 may be removed from reservoir lid 104 to provide fluid communication with reservoir 102 via access hatch 106, e.g., without removing reservoir lid 104. Further, access hatch lid 108 (i.e., in second configuration 1300) may be secured relative to access hatch 106 to at least partially close access hatch 106 to fluid communication with reservoir 102.

In some implementations, embalming machine 100 may include reservoir lid 104 configured to at least partially enclose upper portion 204 of reservoir 102, wherein reservoir lid 104 may include access hatch 106 integrated into reservoir lid 104. For example, and referring at least to the example implementations of FIG. 1-3, embalming machine 100 may include reservoir lid 104 configured to fit around a periphery of an exposed opening in the top of upper portion 204 of reservoir 102. In some particular example embodiments, reservoir lid 104 may be configured to at least partially enclose (i.e., cover) the exposed opening in the top of upper portion 204 of reservoir 102. When positioned to at least partially enclose the exposed opening of reservoir 102, reservoir lid 104 may at least partially and/or fully close reservoir 102 to access. As such, when reservoir lid 104 is at least partially enclosing reservoir 102, reservoir lid 104 may prevent and/or reduce one or more of the escape of vapors from reservoir 102, the splashing or escape of fluids from reservoir 102 and/or the unintended introduction of foreign materials into reservoir 102. In some illustrative example embodiments, reservoir lid 104 may include an opening integrated into the lid itself (e.g., access hatch 106), which may provide selective fluid communication between the interior and exterior of reservoir 102. Accordingly, access hatch 106 may provide a user (e.g., embalmer) with a convenient way to add fluids (and/or other materials, including solids/powders) to reservoir 102 without having to pick up, remove, and replace reservoir lid 104 throughout the embalming process. In some implementations, the access hatch may provide a relatively smaller opening for communication with the reservoir, as compared with the reservoir lid. In some such implementations, the relatively smaller opening of the access hatch may reduce the escape/rate of escape of vapors from the reservoir, may reduce the occurrence of fluids splashing out of the reservoir, and/or may reduce the occurrence of unintended introduction of materials into the reservoir (e.g., by accidentally dropping something into the reservoir, etc.). As will be appreciated in greater detail below, the improved experience of conveniently adding fluids to reservoir 102 via access hatch 106 may be made more efficient through access hatch lid 108. As will be generally appreciated, access hatch 106 may improve the user experience of embalming machine 100 and efficiency of the embalming procedure by providing a convenient way to add fluid to reservoir 102, either before or during an embalming procedure, without removing reservoir lid 104. For example, by equipping embalming machine 100 with access hatch 106, a user may pour fluids directly into access hatch 106 rather than remove reservoir lid 104 to add fluids to reservoir 102 and subsequently run the risk of forgetting to place reservoir lid 104 back on reservoir 102 while the embalming process is in session.

Figure 13:
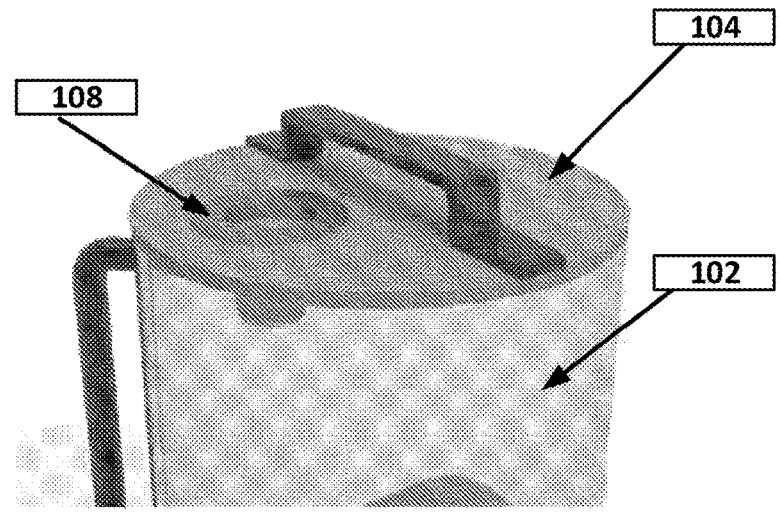
FIG. 13 is a top view of the illustrative example of the embalming machine of FIG. 2 depicting the access hatch lid in a second configuration retained in the access hatch.
Figure 14:
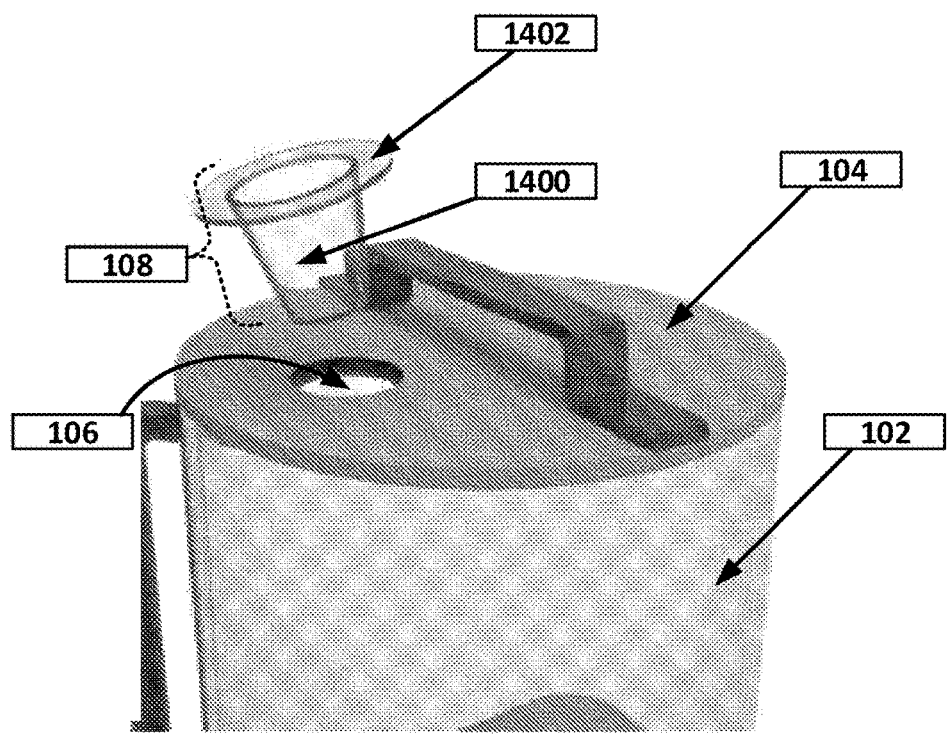
FIG. 14 is a top view of the illustrative example of the embalming machine of FIG. 2 depicting the access hatch lid in the second configuration removed from the access hatch.
Figure 16:
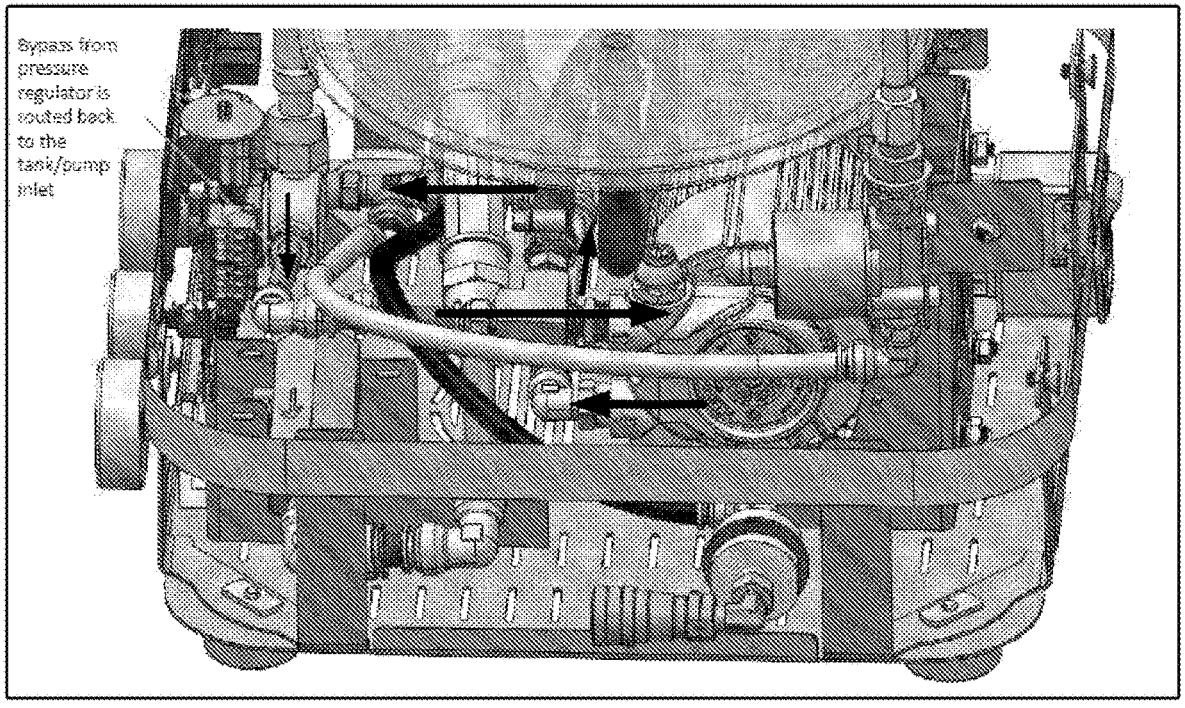
FIG. 16 is a cross-sectional view of the illustrative example of the embalming machine of FIG. 1 depicting a flow path that fluids may take as they circulate throughout the inside the embalming machine.

In some implementations, embalming machine 100 may include access hatch lid 108 integrated into reservoir lid 104, wherein access hatch lid 108 may be shaped to overlie and/or otherwise at least partially, or fully, enclose or occlude access hatch 106. For example, and referring now to at least the example implementations of FIGS. 9-14, there is shown various views and configurations of access hatch lid 108. For example, access hatch lid 108 may be configured to completely cover access hatch 106 such that access hatch lid 108 may be equal to or greater than the size of access hatch 106 so that access hatch lid 108 may cover access hatch 106 without falling into reservoir 102. For example, access hatch lid 108 may also have a tapered design (e.g., with at least a portion of the access hatch lid having one or more dimensions greater than a corresponding dimension of the access hatch), such that access hatch lid 108 may be retained by access hatch 106 and partially depend into reservoir 102. Accordingly, and referring at least to the example implementations of FIGS. 9-12, access hatch lid 108 may include first configuration 900. For example, and as will be explained in greater detail below, access hatch lid 108 may be affixed to reservoir lid 104 by at least one hinge 1100. Consistent with the foregoing, and as will be explained in greater detail below, access hatch lid 108 may be affixed to reservoir lid 104 via one or more hinge joints while in first configuration 900. In some particular example embodiments, and referring at least to the example implementations of FIG. 13-14, access hatch lid 108 may include second configuration 1300. For example, and as will be explained in greater detail below, access hatch lid 108 may be removeably retained in access hatch 106 while in second configuration 1300.

In some implementations, access hatch lid 108 may be affixed to reservoir lid 104 by at least one hinge 902. For example, as generally discussed above and referring again at least to the example implementations of FIGS. 9-12, access hatch lid 108 may include first configuration 900 configured to partially and/or fully cover access hatch 106, such that access hatch lid 108 may be affixed to reservoir lid 104 via a hinge joint. For example, access hatch lid 108 may be affixed (i.e., mounted, fastened) to reservoir lid 104 by at least one hinge 902. As is known in the art, a hinge (such as, e.g., a barrel hinge, butterfly hinge, etc.) may include a mechanical bearing configured to connect two solid objects and permit a limited angle of rotation between them (e.g., pivotal movement of at least one feature relative to at least a second feature). For example, the two objects may rotate relative to each other about a fixed axis of rotation such that the two objects may generally have one degree of freedom with all other translations or rotations being at least partially prevented and/or constrained. In some particular example embodiments, at least one hinge 902 may be configured to provide a slow-close feature (e.g., a damping means). For example, when access hatch lid 108 is pushed closed (i.e., made to move in the direction of access hatch 106), access hatch lid 108 may, without any additional force, gradually descend to the surface of reservoir lid 104 and close access hatch 106. For example, at least one hinge 902 may be configured as a spring-loaded hinge that may be configured to assist in the closing or in the opening of the at least one hinge 902 via a mechanical or hydraulic damper. As is known in the field, a mechanical or hydraulic damper may be used to control the speed at which a hinge moves about an axis. Consistent with the foregoing example, the spring, as a component of the hinge, may apply a force to secure the hinge closed (e.g., wherein a pair of hinge leaves are rotated toward each other) or keep the hinge opened (e.g., wherein a pair of hinge leaves are rotated away from each other). It will be appreciated that at least one hinge 902 may include a number of sectional pieces depending on the type of hinge that may be used, however, other configurations may be possible as well without departing from the scope of the disclosure. For example, at least one hinge 902 may be molded as a single piece (e.g., a living hinge without any knuckles or pins) such that the hinge is continuous via a flexible bearing configured to be an extension of the objects intended to be joined.

In some implementations, at least one hinge 902 may be configured to pivotably raise and lower access hatch lid 108 respective to reservoir lid 104. For example, as generally described above and referring again at least to the example implementations of FIGS. 9-12, access hatch lid 108 may include first configuration 900 configured to be affixed (i.e., mounted, fastened) to reservoir lid 104 by at least one hinge 902. For example, at least one hinge 902 may include a series of cylinders aligned in a row (i.e., such that they may rotate around the same axis), the hollows of which may be configured to receive a shaft that may not only maintain alignment of the series of cylinders, but may also provide for the pivotal movement of the cylinders relative to one another. As shown, at least one of the cylinders (two in the case of the illustrated embodiment) may be coupled with the access hatch lid and at least one of the cylinders may be coupled with the reservoir lid. As such, pivotal movement of the cylinders relative to one another about the axis of the shaft may provide pivotal movement of the access hatch lid relative to the reservoir lid. It will be appreciated that the above-described cylinders may be, in some implementations, integrally formed with the access hatch lid and the reservoir lid, respectively, and/or may include separate features that may be respectively affixed thereto.

In some particular example implementations, one or more O-rings may be disposed between the described respective cylinder (e.g., and may be similarly disposed around the shaft, or hinge pin). Consistent with some such embodiments, the O-rings may frictionally interact with the adjacent cylinders. In some embodiments, the frictional interaction between the O-rings and the cylinders may dampen the rotation of the cylinders relative to one another, and may provide a soft closing of the access hatch lid relative to the reservoir lid (e.g., by controlling and/or reducing the rate of rotation of the cylinders relative to one another for a given rotational force). In some such embodiments, the inclusion of the O-rings may impart a "soft close" feature to the access hatch lid.

For example, as generally described above and referring again at least to the example implementations of FIGS. 9-12, access hatch lid 108 may include first configuration 900. In first configuration 900, access hatch lid 108 may be configured to be affixed to reservoir lid 104 by at least one hinge 902. For example, access hatch lid 108 may be opened to enable a user to add various types of fluids (e.g., embalming fluid, cleaning solutions, and/or water, etc.) to reservoir 102 by pivotably raising access hatch lid 108 via at least one hinge 902 to expose access hatch 106 and allow a user to pour the fluids through access hatch 106. Once the user has finished pouring the fluids into access hatch 106, the user may close access hatch lid 108 over access hatch 106 and repeat as necessary. As such, access hatch lid 108 may contribute to an efficient embalming process by enabling a user to facilitate and observe the instantaneous mixing of fluids at a safe vantage point without necessitating the removal of reservoir lid 104. As generally discussed above, at least one hinge 902 may be configured to enable a slow-close feature such that when access hatch lid 108 is pivotably lowered in the direction of access hatch 106, access hatch lid 108 may, without additional force, gradually descend to the surface of reservoir lid 104 to close access hatch 106. Consequently and as a particular advantage, friction may exist between the series of O-rings and the cooperating hinge features of access hatch lid 108 and reservoir lid 104. As such, in some embodiments, the inclusion of the O-rings may enable access hatch lid 108 to close more slowly and quietly (i.e., so as to reduce clang and noise), and thereby improve the user experience of embalming machine 100.

In some implementations, access hatch 106 may include a filter configured to cover at least a portion, and/or all, of a surface area of access hatch 106. For example, access hatch 106 may include a filter (e.g., mesh webbing) integrated into reservoir lid 104 at the same location of access hatch 106. For example, a filter may be configured to cover a surface area of access hatch 106 by extending across the total area occupied by access hatch 106. Consistent with the foregoing example, the filter may be integrated into reservoir lid 104 as a preventative measure against the unintended entry of debris into access hatch 106. For example, and as will be appreciated by one skilled in the art, the filter may be configured to yield different grain capacities or sieve sizes, such that the filter may be configured to filtrate different grain sizes of debris depending upon the type of filter used. In addition/as an alternative to preventing the intrusion of foreign object into the reservoir, in some implementations, the filter may also aid in reducing and/or preventing fluid splashing out of the reservoir. For example, and as generally discussed above, a filter may be integrated into reservoir lid 104 and cover access hatch 106 as a preventative measure against the unintended entry of debris into access hatch 106. In some implementations, the filter may be made from one or more different materials including, e.g., stainless steel or any alternative metallic or polymer material suitable for providing a substantially rigid (i.e., not easily pierced) structure. In some implementations, the filter may be removeably disposed relative to the access hatch and/or the opening of the reservoir, which may, for example, allow for removal of the filter and/or replacement of the filter. It will be appreciated that in some configurations access hatch 106 may not include a filter integrated into reservoir lid 104. Instead, access hatch 106 may fully expose the interior the external environment when access hatch lid 108 is pivotably raised from reservoir lid 104. Other configurations may be possible as well without departing from the scope of the disclosure.

In some implementations, access hatch lid 108 may include centrally disposed protrusion, or basket 1400, depending downwardly from reservoir lid 104 and into reservoir 102. For example, as generally described above and referring at least to the example implementations of FIGS. 13-14, access hatch lid 108 may include second configuration 1300. For example, and as will be explained in greater detail below, access hatch lid 108 may be removeably retained in access hatch 106 while in second configuration 1300. For example, access hatch lid 108 may include centrally disposed basket 1400 (i.e., cup, bowl, etc.) configured to be removeably retained in, and depend from, access hatch 106. Consistent with some implementations, the access hatch lid may include a portion having a generally corresponding cross-sectional configuration as the access hatch. In this regard, the access hatch lid may be at least partially received in the access hatch, and may at least partially and/or fully occlude or close the access hatch.

For example, and consistent with some illustrative example embodiments, centrally disposed basket 1400 may enable access hatch lid 108 to at least partially extend into reservoir 102 from access hatch 106. In some particular example embodiments, and again referring at least to the example implementations of FIG. 13-14, access hatch lid 108 may include a brim 1402 (e.g., rim, lip, etc.), wherein centrally disposed basket 1400 and brim 1402 may comprise a unitary structure and/or an assembly. For example, brim 1402 may be an extension of a top of centrally disposed basket 1400, wherein brim 1402 may be configured to engage just beyond a periphery of access hatch 106, such that brim 1402 may be seated atop reservoir lid 104 while centrally disposed basket 1400 may depend from access hatch 106 and into the interior of reservoir 102. In some particular example embodiments, centrally disposed basket 1400 may include a bottom wall and a side wall having a top edge and a bottom edge, wherein the bottom edge may be continuously joined to the bottom wall and the top edge may be continuously joined to brim 1402. In some implementations, the side wall of centrally disposed basket 1400 may include an encircling side wall. It will be appreciated that "encircling" may be understood to include any shape consisting of a curved line that completely encloses a space. For example, the side wall may be circular (i.e., to form a cylinder), ovoid (i.e., egg-shaped), or conical (i.e., cone-shaped); however, other configurations may be imagined within the scope of the disclosure. For example, the side wall may be configured to any shape (e.g., polygon, irregular, or asymmetrical) consistent with the space occupied by access hatch 106, such that centrally disposed basket 1400 may fit seamlessly against a perimeter of access hatch 106.

In some implementations, centrally disposed basket 1400 may be dimensioned for insertion into access hatch 106 such that access hatch lid 108 may be configured to be removeably retained to reservoir lid 104. For example, and as generally discussed above, access hatch lid 108 may include centrally disposed basket 1400 depending downwardly from reservoir lid 104 and into reservoir 102. It will be appreciated that the depth that the centrally disposed basket depict downwardly from the reservoir lid may vary. For example, in some implementations that centrally disposed basket may depend a notable degree into the reservoir. In some implementations, the centrally disposed basket may only depend approximately the thickness of the reservoir lid, e.g., such that the centrally disposed basket may provide lateral location and retention of the access hatch lid relative to the access hatch and/or reservoir lid, with minimal intrusion into the reservoir. Variation between the foregoing ranges are equally contemplated by the present disclosure.

Consistent with the foregoing example, centrally disposed basket 1400 may include a maximum width adapted to be less than a diameter of access hatch 106. In a corresponding manner and as generally discussed above, access hatch lid 108 may include brim 1402, wherein brim 1402 may be wider than access hatch 106 such that brim may rest beyond the perimeter of access hatch 106 and atop at least a portion of reservoir lid 104. For example, brim 1402 may include a maximum width adapted to be greater than a diameter of access hatch 106. In some implementations, access hatch lid 108 may not include brim 1402. For example, at least a portion of access hatch lid 108 may include a cooperatively tapered end, such that the engagement between access hatch lid 108 and access hatch 106 may removeably retain access hatch lid 108 relative to access hatch 106 via friction. In some particular example embodiments, centrally disposed basket 1400 may be used as a measuring tool for various fluids used during the embalming process. For example, the side wall of centrally disposed basket 1400 may include an upwardly directed indicia on at least a portion of the side wall, wherein the upwardly directed indicia may be at least one of standard and/or metric units of measurement. Accordingly, a user may have the option to pour fluids into centrally disposed basket 1400 using the indicia to measure the fluids prior to adding the fluids to reservoir 102 via access hatch 106.

In some implementations, embalming machine 100 may further include tube 200 vertically extending from lower portion 202 to upper portion 204 of reservoir 102, wherein tube 200 provides a pathway for fluid 206 to travel to reservoir 102. For example, and referring at least to the example implementation of FIG. 2, tube 200 may extend upwardly (e.g., ascending diagonally, or vertically) along a side of reservoir 102 between lower portion 202 and upper portion 204 of reservoir 102. For example, tube 200 may stem from the bottom of reservoir 102, but may not necessarily be positioned at the absolute bottom of reservoir 102.

Similarly, tube 200 may peak at the top of reservoir 102, but may not necessarily be positioned at the absolute top of reservoir 102.

In some implementations, embalming machine 100 may further include port 300 in fluid communication with tube 200 adjacent to upper portion 204 of reservoir 102, wherein port 300 may be configured to dispense fluid 206 traveling through tube 200 and into an interior of reservoir 102. For example, port 300 may be connected to tube 200 positioned adjacent to the top of reservoir 102, but may not necessarily be positioned at the absolute top of reservoir. For example, tube 200 may provide a pathway for fluid 206 to travel to reservoir 102, such that fluid 206 may be pumped through tube 200 by embalming machine 100 and dispensed from port 300 into reservoir 102.

In some implementations, port 300 may be positioned to dispense fluid 206 into the interior of reservoir 102 to flow in a generally centrifugal motion around the interior of reservoir 102. For example, port 300 may be positioned generally tangentially to an inner surface of reservoir 102. As such, when fluid 206 is dispensed from port 300 it may be directed to make contact with the inner surface of reservoir 102 and consequently experience a generally centrifugal motion 302 around the interior of reservoir 102.

In some implementations, at least a portion of the interior of reservoir 102 may include hydrophobic surface 400. For example, and as generally discussed above, to easily clean hydrophobic surface 400, a user may select a clean mode from a number of selectable settings on embalming machine 100, wherein selecting the clean mode may cause embalming machine 100 to pump water and/or cleaning solution through the system and through tube 200. When the water and/or cleaning solution is dispensed from port 300, the water and/or the cleaning solution may flow in a radial path around the interior of reservoir 102 via the generally centrifugal motion 302 to rid the inner surface of reservoir 102 of any staining, dirt or oil that has accumulated during the embalming process. As such, hydrophobic surface 400 may provide an easy clean and stain-free surface for reservoir 102.

In some implementations, embalming machine 100 may further include a number of selectable settings, the selectable settings including, at least in part, a clean mode and a mix mode. For example, and as generally discussed above, a user may select from a number of selectable settings throughout the embalming process, wherein the number of selectable settings may be labeled on embalming machine, and more specifically positioned around setting knob 110 (and/or via another suitable selection interface), such that the user may turn setting knob 110 in the direction of the desired setting until a dial on setting knob 110 aligns with the desired setting to activate the respective mode. In some implementations, the number of selectable settings may further include, but not limited to, a pulse mode, an inject mode, and/or an off/gravity mode.

In some implementations, fluid 206 may be dispensed from port 300 and into the interior of reservoir 102 at a defined pressure. For example, the level of intensity experienced by fluid 206 in the system may be dependent upon a particular pressure set by the user (e.g., embalmer), and/or a particular pressure defined based upon one or more parameters or criteria, or the like.

In some implementations, fluid 206 may be dispensed from port 300 and into the interior of reservoir 102 at a defined flow rate. For example, the level of intensity experienced by fluid 206 in the system may be dependent upon a particular flow rate set by the user (e.g., embalmer), and/or otherwise determined or selected.

In some implementations, and referring at least to the example implementations of FIGS. 9-12, embalming machine 100 may include reservoir 102. Embalming machine 100 may include reservoir lid 104 configured to at least partially enclose upper portion 204 of reservoir 102, wherein reservoir lid 104 may include access hatch 106 providing fluid communication between an interior of reservoir 102 and an exterior of reservoir 102. Embalming machine 100 may include access hatch lid 108 removeably disposed relative to access hatch 106 to substantially close access hatch 106 to fluid communication with the interior of reservoir 102.

In some implementations, embalming machine 100 may include reservoir 102. For example, and referring at least to the example implementation of FIG. 1, an example embalming machine 100 is shown. For example, embalming machine 100 may include reservoir 102 for collecting, mixing, and dispensing fluids.

In some implementations, embalming machine 100 may include reservoir lid 104 configured to at least partially enclose upper portion 204 of reservoir 102, wherein reservoir lid 104 may include access hatch 106 providing fluid communication between an interior of reservoir 102 and an exterior of reservoir 102. As generally appreciated throughout the specification, access hatch 106 may contribute to the efficient mixing of fluids during an embalming process and provide efficient cleaning of the interior of reservoir 102. For example, access hatch 106 may enable a user to conveniently add various types of fluids (e.g., embalming fluid, cleaning solutions, and/or water, etc.) to reservoir 102 without requiring the user to remove reservoir lid 104. For example, instead of removing reservoir lid 104 to access the interior of reservoir 102, a user may pour fluids directly into access hatch 106 instead.

In some implementations, embalming machine 100 may include access hatch lid 108 removeably disposed relative to access hatch 106 to substantially close access hatch 106 to fluid communication with the interior of reservoir 102. For example, access hatch 106 may enable a user to conveniently add various types of fluids (and/or solids or powders) to reservoir 102 by pivotably raising access hatch lid 108 (e.g., a hinged lid), or by removing access hatch lid 108 from access hatch (e.g., disposed basket), to expose access hatch 106, and pouring the fluids through access hatch 106. After which, the user may close access hatch lid 108 over access hatch 106 and repeat the process as necessary.

In some implementations, access hatch lid 108 may be hinged relative to reservoir lid 104 for pivotal movement between an open position that may permit fluid communication between the interior of reservoir 102 and an exterior of reservoir 102, and closed position which may be configured to close access hatch 106 to fluid communication between the interior of reservoir 102 and the exterior of reservoir 102. For example, as generally discussed above and referring again at least to the example implementations of FIGS. 9-12, access hatch lid 108 may include a first configuration 900. For example, access hatch lid 108 in first configuration 900 may be affixed to reservoir lid 104 by at least one hinge 902. As generally discussed above, at least one hinge 902 may be configured to pivotably raise (i.e., away from) and lower (i.e., descend toward/onto) access hatch lid 108 respective to the location of access hatch 106. For example, when access hatch lid 108 is pivotably raised via at least one hinge 902, access hatch lid 108 may rise up and away from reservoir lid 104 to reveal access hatch 106, such that the interior of reservoir 102 may experience fluid communication (i.e., non-disruptive exposure) to the exterior environment (i.e., exterior of reservoir). In a corresponding manner, when access hatch lid 108 is pivotably lowered, access hatch lid 108 may descend toward reservoir lid 104 to conceal access hatch 106, such that the fluid communication of the interior of reservoir 102 and the exterior environment is ceased.

In some implementations, access hatch lid 108 may be removeably retained relative to access hatch 106 to permit fluid communication between the interior of reservoir 102 and the exterior of reservoir 102 and to close access hatch 106 to fluid communication between the interior of reservoir 102 and the exterior of reservoir 102. For example, as discussed above and again referring at least to the example implementations of FIGS. 13-14, access hatch lid 108 may include second configuration 1300 including a centrally disposed basket 1400 and brim 1402 which may comprise a unitary structure and/or an assembly. Consistent with the foregoing example and while in second configuration 1300, access hatch lid 108 may be removeably retained in access hatch 106 such that access hatch lid 108 may be removed entirely (e.g., lifted up or popped out by hand) from the reservoir lid 104 to reveal access hatch 106 and provide fluid communication (i.e., non-disruptive exposure) between the interior of reservoir 102 and the exterior environment, and may be returned to, and retained in, access hatch 106 to cease fluid communication between the interior of reservoir 102 and the exterior environment. Accordingly, access hatch 106 may enable a user to add various types of fluids (e.g., embalming fluid, cleaning solutions, and/or water, etc.) to reservoir 102 by directly pouring the fluids through access hatch 106, thereby contributing to the efficient mixing of fluids in reservoir 102 and to the cleaning of the interior of reservoir 102 without necessitating the removal of reservoir lid 104. For example, access hatch lid 108 may include centrally disposed basket 1400 (i.e., cup, bowl, etc.) configured to be removeably retained in, and depend from, access hatch 106. For example, centrally disposed basket 1400 may enable access hatch lid 108 to at least partially extend into reservoir 102 from access hatch 106. In some particular example embodiments, and again referring at least to the example implementations of FIG. 13-14, access hatch lid 108 may include a brim 1402 (e.g., rim, lip, etc.), wherein centrally disposed basket 1400 and brim 1402 may comprise a unitary structure and/or an assembly. For example, brim 1402 may be an extension of a top of centrally disposed basket 1400, wherein brim 1402 may be configured to engage just beyond (and/or significantly beyond) a periphery of access hatch 106, such that brim 1402 may be seated atop reservoir lid 104 while centrally disposed basket 1400 may depend from access hatch 106 and into the interior of reservoir 102.

In some implementations, and referring also to at least the example implementations of FIGS. 1-6, a method for mixing of fluids in embalming machine 100 may include selecting a clean mode from a number of selectable settings on embalming machine 100.

In some implementations, embalming machine 100 may include reservoir 102. For example, reservoir 102 may be cylindrical, and/or any other suitable shape or configuration. As discussed above, and referring at least to the example implementation of FIGS. 3-4, consistent with some embodiments a cylindrical shape of reservoir 102 may promote efficient cleaning and mixing techniques by promoting a generally centrifugal motion 302 during fluid dispensing from port 300 and injection from at least second tube 304.

In some implementations, embalming machine 100 may include tube 200 vertically extending from lower portion 202 to upper portion 204 of reservoir 102, wherein tube 200 provides a pathway for fluid 206 to travel to reservoir 102. For example, and referring at least to the example implementation of FIG. 2, tube 200 may extend upwardly (e.g., ascending diagonally, or vertically) along a side of reservoir 102 between lower portion 202 and upper portion 204 of reservoir 102. For example, tube 200 may stem from the bottom of reservoir 102, but may not necessarily be positioned at the absolute bottom of reservoir 102. Similarly, tube 200 may peak at the top of reservoir 102, but may not necessarily be positioned at the absolute top of reservoir 102.

In some implementations, port 300 may be fluidly coupled to tube 200 adjacent to upper portion 204 of reservoir 102. For example, port 300 may be connected to an end of tube 200 positioned at, or near, a top of reservoir 102, but may not necessarily be positioned at an absolute top of reservoir.

In some implementations, reservoir lid 104 may be configured to at least partially enclose upper portion 204 of reservoir 102, wherein reservoir lid 104 may include access hatch 106 integrated into reservoir lid 104. For example, and referring at least to the example implementations of FIGS. 7-8, embalming machine 100 may include reservoir lid 104 configured to fit around a periphery of an exposed opening in a top of upper portion 204 of reservoir 102. In some implementations, reservoir lid 104 may be configured to at least partially enclose the exposed opening in upper portion 204 of reservoir 102. For example, reservoir lid 104 may include access hatch 106 integrated into reservoir lid 104, wherein access hatch 106 may be configured to partially expose the interior of reservoir 102 to an external environment. For example, access hatch 106 may enable a user to add various types of fluids (e.g., embalming fluid, cleaning solutions, and/or water, etc.), and/or other materials, to reservoir 102 by directly pouring the fluids through access hatch 106. As such, access hatch 106 may contribute to the efficient mixing of fluids in reservoir 102 and to the cleaning of the interior of reservoir 102 without necessitating the removal of reservoir lid 104. Consequently, access hatch 106 may reduce (or gradually release) the amount of fumes that may otherwise escape from reservoir 102 if reservoir 102 were entirely exposed to the external environment.

In some implementations, access hatch lid 108 may be integrated into reservoir lid 104, wherein access hatch lid 108 may be shaped to overlie access hatch 106. For example, access hatch lid 108 may be configured to completely cover access hatch 106 such that access hatch lid 108 may be equal to or greater than the size of access hatch 106 so that access hatch lid 108 may cover access hatch 106 without falling into reservoir 102. For example, access hatch lid 108 may also have a tapered design, such that access hatch lid 108 may be retained by access hatch 106 and partially depend into reservoir 102. Other configurations are possible as well without departing from the scope of the disclosure.

In some implementations, the method may further include dispensing fluid 206 from port 300 and into an interior of reservoir 102. For example, tube 200 may provide a pathway for fluid 206 to travel to reservoir 102 such that fluid 206 may be pumped through tube 200 and dispensed from port 300 into reservoir 102.

In some implementations, the method may further include pouring at least a second fluid 700 through access hatch 106 and into the interior of reservoir 102. For example, and referring to at least the example implementation of FIGS.

7-8, a user may have the option to add various types of fluids to reservoir 102 via access hatch 106 when reservoir 102 is empty or when fluids may already exist inside reservoir 102 and are flowing in centrifugal motion 302. Accordingly, by pouring at least a second fluid 700 (which may include the same or similar fluid as the first fluid and/or may include a different fluid) through access hatch 106 and into reservoir 102, at least second fluid 206 may mix with the existing fluid by flowing along the same radial path around the interior of reservoir 102 via centrifugal motion 302. For example, the generally centrifugal motion 302 of the first fluid 206 may draw in the at least second fluid 700 and may facilitate mixing of the fluids. It will be appreciated that the at least second fluid 700 may include various types of fluids including, but not limited to, embalming fluid, cleaning solutions, and/or water as required by the particular mode (e.g., clean mode, mix mode, etc.) selected on embalming machine 100. For example, when embalming machine 100 is set to a mix mode, at least second fluid 700 may be poured into access hatch 106 and may comprise various types of embalming fluid and/or water.

In some implementations, port 300 may be positioned to dispense fluid into the interior of reservoir 102 to flow in a generally centrifugal motion 302 around the interior of reservoir 102. For example, and as discussed above, tube 200 may provide a pathway for fluid 206 to travel to reservoir 102, such that fluid 206 may be pumped through tube 200 by embalming machine 100 and dispensed from port 300 into reservoir 102. Consistent with the foregoing, fluid 206 may travel through tube 200 and dispense tangent to an interior surface of reservoir 102 and flow in a generally centrifugal motion (i.e., "whirlpool" behavior) around the interior of reservoir 102.

In some implementations, fluid may be dispensed from port 300 and into the interior of reservoir 102 at a defined pressure. For example, fluid 206 may be dispensed from port 300 at a defined pressure rate that may be automatically set to a desired value (e.g., at a user selected value, or the like).

In some implementations, fluid may be dispensed from port 300 and into the interior of reservoir 102 at a defined flow rate. For example, fluid 206 may be dispensed from port 300 at a defined flow rate that may be automatically set to an desired value (e.g., at a user selected value, or the like).

While various combinations of features, aspects, and concepts have been described in the context of an embalming machine, it should be appreciated that the various features, aspects, and concepts may be utilized alone, and/or in various additional combinations and/or sub-combinations with one another.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

A number of implementations have been described. Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. An embalming machine comprising:
    a reservoir;
    a tube extending from a lower portion to an upper portion of the reservoir, wherein the tube provides a pathway for fluid to travel to the reservoir; and
    a port at an end of the tube adjacent to the upper portion of the reservoir, wherein the port is configured to dispense the fluid traveling through the tube into an interior of the reservoir;
    an inject outlet;
    a pump operable to pump fluid from the reservoir and to the inject outlet and/or the port;
    a mix solenoid to which fluid flows from the pump to be directed to the tube to dispense fluid from the port into the reservoir to facilitate mixing of fluid in the reservoir;
    a pressure regulator having a pressure relief bypass along which fluid flows to route fluid flowing from the pump back to the reservoir, the pressure regulator operable to control a proportion of the fluid routed to the reservoir via the pressure relief bypass to control a pressure of the fluid flowing from the pump;
    a user interface configured to receive a pressure setting input for the embalming machine to cause the pressure regulator to set the proportion of the fluid flowing in the pressure relief bypass.

2. The embalming machine according to claim 1 wherein the port is positioned to dispense fluid into the interior of the reservoir to flow in a generally centrifugal motion around the interior of the reservoir.

3. The embalming machine according to claim 2 wherein at least a portion of the interior of the reservoir includes a hydrophobic surface.

4. The embalming machine according to claim 1 further comprising a number of selectable settings, the selectable settings including, at least in part:
    a clean mode; and
    a mix mode.

5. The embalming machine according to claim 1 wherein the pressure regulator is configured to cause fluid to be dispensed from the port and into the interior of the reservoir at a defined pressure based at least in part on the pressure setting.

6. The embalming machine according to claim 1 wherein the pump is operable to cause fluid to be dispensed from the port and into the interior of the reservoir at a defined flow rate.

7. The embalming machine according to claim 1 further comprising:
   at least a second tube projecting from inside of the lower portion of the reservoir, wherein at least the second tube is configured to inject fluid into the interior of the reservoir.

8. The embalming machine according to claim 1 further comprising:
   a reservoir lid configured to at least partially enclose the upper portion of the reservoir,
   wherein the reservoir lid includes an access hatch integrated into the reservoir lid.

9. The embalming machine according to claim 1 further comprising an inject mode where the fluid is pumped to the inject outlet and to the port via the mix solenoid.

10. The embalming machine according to claim 1 wherein the user interface includes a pressure regulator knob rotatable to input the pressure setting input.

11. The embalming machine according to claim 4 wherein the user interface is further configured to receive an operation mode input selecting one of the selectable settings.

12. The embalming machine according to claim 1 further comprising:
   a hydraulic flow valve through which fluid flows to the inject outlet;
   a flow rate sensor to monitor a flow rate of fluid flowing through the hydraulic flow valve; and
   a control circuit operably coupled to the flow rate sensor and a display of the user interface, the control circuit configured to cause the flow rate to be presented on the display.

13. The embalming machine according to claim 1 further comprising a flow sensor to monitor a flow rate of fluid in the embalming machine.

14. The embalming machine according to claim 13 wherein the flow sensor is positioned to monitor flow from the pump to the inject outlet.

15. The embalming machine according to claim 13 wherein the flow sensor is an ultrasonic flow sensor.

16. The embalming machine according to claim 1 wherein the user interface includes at least one display screen to present a pressure reading.

17. An embalming machine comprising:
   a reservoir;
   a tube extending from a lower portion to an upper portion of the reservoir, wherein the tube provides a pathway for fluid to travel to the reservoir; and
   a port at an end of the tube adjacent to the upper portion of the reservoir, wherein the port is configured to dispense the fluid traveling through the tube and into an interior of the reservoir;
   an inject outlet;
   a pump operable to pump fluid from the reservoir and to the inject outlet and/or the port;
   a mix solenoid to which fluid flows from the pump to be directed to the tube to dispense fluid from the port into the reservoir to facilitate mixing of fluid in the reservoir;
   a pressure regulator operable to control a pressure of the fluid flowing from the pump;
   a hydraulic flow valve through which fluid flows to the inject outlet;
   a flow sensor to measure flow of fluid through the hydraulic valve to the inject outlet;
   a user interface including a display; and
   a control circuit operably coupled to the flow sensor and the user interface and configured to:
   receive a flow rate value from the flow sensor;
   cause the flow rate to be presented on the display.

\* \* \* \* \*